US012003551B1

(12) United States Patent
J S et al.

(10) Patent No.: US 12,003,551 B1
(45) Date of Patent: Jun. 4, 2024

(54) LAWFULLY INTERCEPTING TRAFFIC FOR ANALYSIS INDEPENDENT OF A PROTOCOL ASSOCIATED WITH THE TRAFFIC

(71) Applicant: Juniper Networks, Inc., Sunnyvale, CA (US)

(72) Inventors: Sheeja J S, Bangalore (IN); Manoj Kumar V, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 243 days.

(21) Appl. No.: 16/588,007

(22) Filed: Sep. 30, 2019

(51) Int. Cl.
*H04L 9/40* (2022.01)
*H04L 12/46* (2006.01)
(Continued)

(52) U.S. Cl.
CPC .......... *H04L 63/306* (2013.01); *H04L 43/028* (2013.01); *H04L 63/164* (2013.01);
(Continued)

(58) Field of Classification Search
CPC ....... G06F 2009/45595; G06F 9/45558; G06F 9/547; G06F 13/28; G06F 15/17325; G06F 15/17331; G06F 16/907; G06F 2209/509; G06F 2213/28; G06F 9/4411; G06F 9/4843; G06F 9/5027; G06F 9/5044; G06F 9/5072; G06F 9/5088; G06F 9/522; G06F 13/30; G06F 13/4027; G06F 2009/45579; G06F 2009/45587; G06F 2213/40; G06F 3/0604; G06F 3/061; G06F 3/0656; G06F 3/0679; G06F 9/44; G06F 9/45533; G06F 9/45541; G06F 9/5083; G06F 9/541; G06F 9/544; H04L 63/02; H04L 63/101; H04L 63/16; H04L 67/14; H04L 67/36; H04L 69/22; H04L 69/32; H04L 9/0841; H04L 9/085; H04L 9/0894; H04L 41/147; H04L 43/0817; H04L 43/0835; H04L 67/146; H04L 1/00; H04L 1/1854; H04L 12/4633; H04L 12/4641; H04L 12/66; H04L 29/06;
(Continued)

(56) References Cited

U.S. PATENT DOCUMENTS 8,116,307 B1* 2/2012 Thesayi ................. H04L 43/00
370/389
8,537,676 B1* 9/2013 Apte ....................... H04L 69/16
370/232
(Continued)

*Primary Examiner* — Djenane M Bayard
(74) *Attorney, Agent, or Firm* — Harrity & Harrity, LLP

(57) ABSTRACT

A network device may receive a request to install a rule set, and may add, based on the request, information identifying the rule set to a list of rule sets associated with the network device. The network device may receive a packet destined for an endpoint device, may generate a copy of the packet, and may cause the packet to be forwarded to the endpoint device. The network device may perform deep packet inspection of the copy of the packet to identify a packet rule set associated with the copy of the packet, and may determine whether the packet rule set, associated with the copy of the packet, corresponds to the rule set. The network device may cause the copy of the packet to be forwarded to a content destination device when the packet rule set, associated with the copy of the packet, corresponds to the rule set.

20 Claims, 16 Drawing Sheets

(51) Int. Cl.
*H04L 43/028* (2022.01)
*H04L 69/16* (2022.01)
*H04L 45/50* (2022.01)

(52) U.S. Cl.
CPC .............. *H04L 63/20* (2013.01); *H04L 69/16* (2013.01); *H04L 12/4633* (2013.01); *H04L 12/4641* (2013.01); *H04L 45/50* (2013.01)

(58) Field of Classification Search
CPC . H04L 41/0806; H04L 41/0893; H04L 41/12; H04L 41/5096; H04L 43/028; H04L 43/045; H04L 43/065; H04L 43/18; H04L 45/021; H04L 45/30; H04L 45/7453; H04L 47/10; H04L 47/2416; H04L 47/2433; H04L 47/2475; H04L 47/36; H04L 61/1511; H04L 63/0236; H04L 63/029; H04L 63/126; H04L 63/1408; H04L 63/1433; H04L 63/145; H04L 63/164; H04L 63/0254; H04L 63/0263; H04L 9/40; H04L 12/413; H04L 63/0227; H04L 41/0213; H04L 43/026; H04L 63/0281; H04L 63/1425; H04L 63/20; H04L 45/745; H04L 45/74; H04L 63/0209; H04L 45/02; H04L 63/0218; H04L 67/02; H04L 43/12; H04L 45/38; H04L 61/4511; H04L 45/50; H04L 45/64; H04L 45/00; H04L 69/16; H04L 43/20; H04L 47/2441; H04L 47/20; H04L 43/16; H04L 43/00; H04L 43/062; H04L 49/25; H04L 47/125; H04L 63/1458; H04L 45/22; H04L 43/04; H04L 47/11; H04L 49/201; H04L 63/06; H04L 41/0895; H04L 49/90; H04L 49/70; H04L 63/306; H04L 63/0245; H04L 63/1416; H04L 63/166; H04L 63/308

See application file for complete search history.

(56) References Cited

U.S. PATENT DOCUMENTS

| | | | |
|---|---|---|---|
| 10,764,313 B1* | 9/2020 | Mushtaq | G06N 20/00 |
| 11,070,522 B1* | 7/2021 | Maharia | H04L 63/1425 |
| 2007/0030803 A1* | 2/2007 | Gooch | H04L 49/90 370/235 |
| 2011/0162060 A1* | 6/2011 | Vijayakumar | H04L 12/413 726/13 |
| 2011/0170552 A1* | 7/2011 | Suzuki | H04L 49/9078 370/401 |
| 2014/0036921 A1* | 2/2014 | Hutt | H04L 43/028 370/392 |
| 2014/0223564 A1* | 8/2014 | Joo | H04L 63/1416 726/23 |
| 2014/0226478 A1* | 8/2014 | Manuguri | H04L 47/20 370/235 |
| 2018/0183756 A1* | 6/2018 | Bangalore Krishnamurthy | H04L 63/0227 |
| 2019/0116111 A1* | 4/2019 | Izard | H04L 45/745 |

* cited by examiner

LAWFULLY INTERCEPTING TRAFFIC FOR ANALYSIS INDEPENDENT OF A PROTOCOL ASSOCIATED WITH THE TRAFFIC

BACKGROUND

Lawful interception includes obtaining network traffic pursuant to a lawful authority for the purpose of analysis and/or evidence. Such traffic may include signaling or network management information or content of communications.

SUMMARY

According to some implementations, a method may include receiving a request to install a rule set, and adding, based on the request, information identifying the rule set to a list of rule sets associated with a network device. The method may include receiving a packet destined for an endpoint device, generating a copy of the packet, and causing the packet to be forwarded to the endpoint device. The method may include performing deep packet inspection of the copy of the packet to identify a packet rule set associated with the copy of the packet, and determining whether the packet rule set, associated with the copy of the packet, corresponds to the rule set added to the list of rule sets. The method may include causing the copy of the packet to be forwarded to a content destination device when the packet rule set, associated with the copy of the packet, corresponds to the rule set.

According to some implementations, a network device may include one or more memories, and one or more processors to receive a request to install a rule set, and add, based on the request, information identifying the rule set to a list of rule sets associated with the network device. The one or more processors may receive a packet destined for an endpoint device, may generate a copy of the packet, and may cause the packet to be forwarded to the endpoint device. The one or more processors may perform deep packet inspection of the copy of the packet to identify a packet rule set associated with the copy of the packet, and may determine whether the packet rule set, associated with the copy of the packet, corresponds to the rule set added to the list of rule sets. The one or more processors may cause the copy of the packet to be forwarded to a content destination device when the packet rule set, associated with the copy of the packet, corresponds to the rule set, and may prevent the copy of the packet from being forwarded to the content destination device when the packet rule set, associated with the copy of the packet, fails to correspond to the rule set.

According to some implementations, a non-transitory computer-readable medium may store one or more instructions that, when executed by one or more processors of a network device, may cause the one or more processors to receive a request to install a rule set, and may add, based on the request, information identifying the rule set to a list of rule sets associated with the network device. The one or more instructions may cause the one or more processors to receive a packet destined for an endpoint device, generate a copy of the packet, and cause the packet to be forwarded to the endpoint device. The one or more instructions may cause the one or more processors to perform deep packet inspection of the copy of the packet to identify a packet rule set associated with the copy of the packet, and determine whether the packet rule set, associated with the copy of the packet, corresponds to the rule set added to the list of rule sets. The one or more instructions may cause the one or more processors to selectively perform a first action or a second action based on whether the packet rule set, associated with the copy of the packet, corresponds to the rule set added to the list of rule sets. The first action may include causing the copy of the packet to be forwarded to a content destination device when the packet rule set, associated with the copy of the packet, corresponds to the rule set. The second action may include preventing the copy of the packet from being forwarded to the content destination device when the packet rule set, associated with the copy of the packet, fails to correspond to the rule set.

DETAILED DESCRIPTION

Figure 1A:
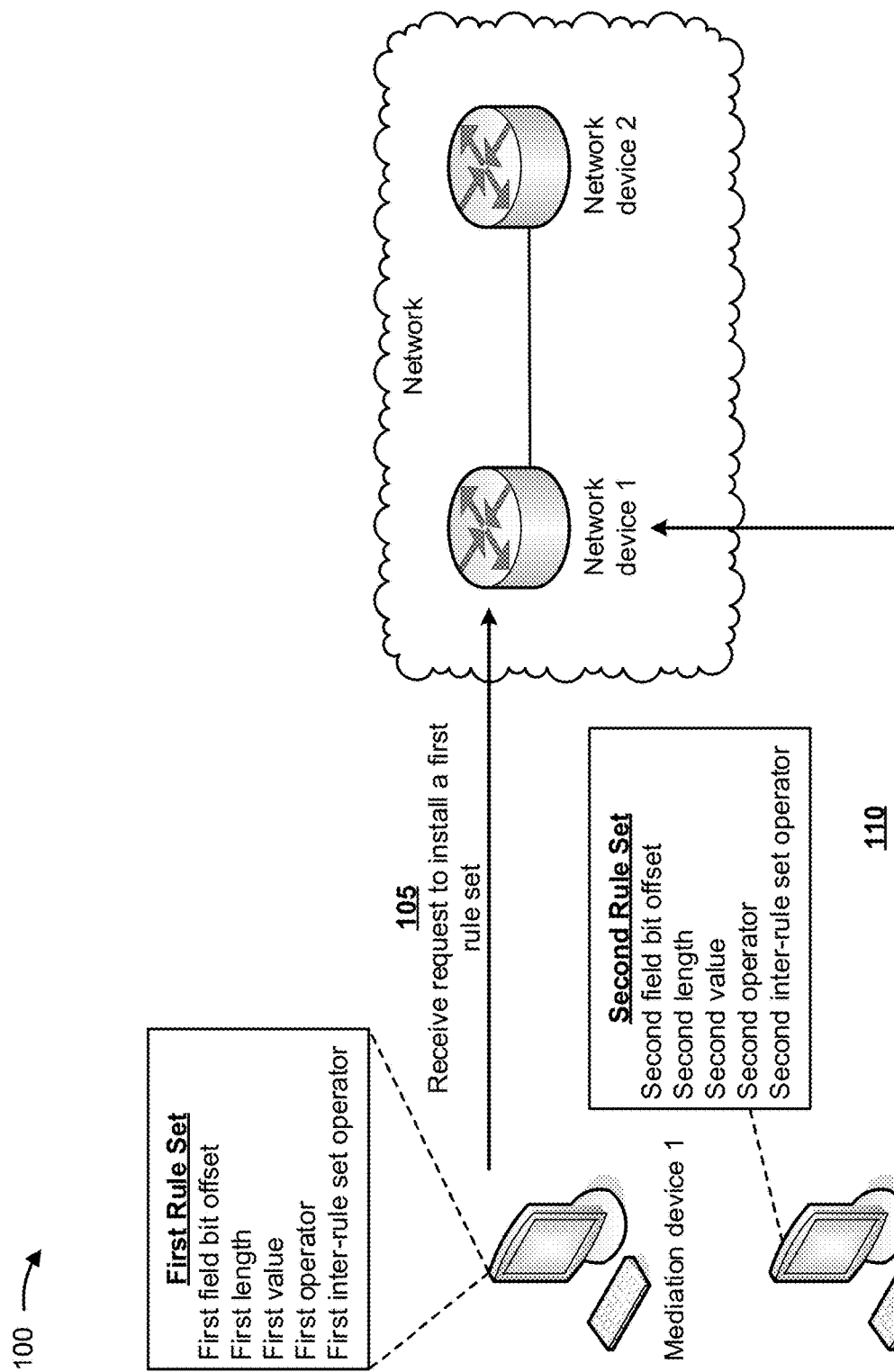
FIGS. 1A-1J are diagrams of one or more example implementations described herein.

The following detailed description of example implementations refers to the accompanying drawings. The same reference numbers in different drawings may identify the same or similar elements.

Network traffic may be lawfully intercepted at a network device (e.g., a router, a firewall, and/or the like) via flow tapping. The flow tapping copies or mirrors traffic that passes between two network devices. The original traffic is forwarded to a destination and the copied traffic is forwarded to a content destination device that analyzes the copied traffic. The content destination device may include a content destination device identified by a law enforcement authority (e.g., a police department, a government agency, and/or the like). Network devices are only capable of tapping traffic (e.g., packets) based on a specific set of defined parameters, such as a source Internet protocol (IP) address, a destination IP address, a source port, a destination port, and/or the like.

However, IP networks support various types of traffic forwarding (e.g., multiprotocol label switching (MPLS), IP version 4 (IPv4) IP version 6 (IPv6), and/or the like) and tunneling (e.g., IP-in-IP, generic routing encapsulation (GRE), Dual-Stack Lite (DS-Lite), MPLS over user datagram protocol (UDP), MPLS over GRE, and/or the like). For example, in an IP-in-IP tunneling scenario, a law enforcement authority is unable to capture traffic based on source and destination IP addresses of an inner IP header since flow tapping does not support IP-in-IP tunneling. This causes the law enforcement authority to capture all traffic received by network devices (e.g., based on an external IP header) and filter the traffic for traffic of interest (e.g., traffic that includes the source and destination IP addresses of the inner IP header). Thus, the law enforcement authority wastes computing resources (e.g., processing resources, memory resources, and/or the like), communication resources, networking resources, and/or the like storing all of the traffic, filtering all of the traffic for only the traffic of interest, and/or the like. Furthermore, if such traffic is not monitored, bad actors may not be captured and may cause further waste of resources associated with handling malicious acts committed by the bad actors.

Some implementations described herein provide a network device that intercepts traffic for analysis independent of a protocol associated with the traffic. For example, the network device may receive a request to install a rule set, and may add, based on the request, information identifying the rule set to a list of rule sets associated with the network device. The network device may receive a packet destined for an endpoint device, may generate a copy of the packet, and may cause the packet to be forwarded to the endpoint device. The network device may perform deep packet inspection of the copy of the packet to identify a packet rule set associated with the copy of the packet, and may determine whether the packet rule set, associated with the copy of the packet, corresponds to the rule set added to the list of rule sets. The network device may cause the copy of the packet to be forwarded to a content destination device when the packet rule set, associated with the copy of the packet, corresponds to the rule set, and may prevent the copy of the packet from being forwarded to the content destination device when the packet rule set, associated with the copy of the packet, fails to correspond to the rule set.

In this way, network traffic may be intercepted for analysis independently of protocols associated with the network traffic, which reduces or prevents law enforcement authorities from capturing all traffic received by network devices and filtering the traffic for traffic of interest, and/or the like. This, in turn, conserves computing resources (e.g., processing resources, memory resources, and/or the like), communication resources, networking resources, and/or the like that would otherwise be wasted in storing all of the traffic, transporting all of the traffic, filtering all of the traffic, and/or the like.

FIGS. 1A-1J are diagrams of one or more example implementations 100 described herein. As shown in FIG. 1A, a first mediation device (e.g., mediation device 1) and a second mediation device (e.g., mediation device 2) may communicate and exchange traffic with a network. The network may include multiple network devices (e.g., routers, gateways, and/or the like), such as a first network device (e.g., network device 1), a second network device (e.g., network device 2), and/or the like. The two network devices shown in FIGS. 1A-1J are provided merely as examples of network devices, and, in practice, the network may include additional network devices. The mediation devices may be associated with one or more entities and/or law enforcement authorities (e.g., police departments, government agencies, corporations, educational institutions, and/or the like) and may be utilized by the law enforcement authorities to request, from the network, particular traffic that is to be monitored for the purpose of analysis and/or evidence.

As further shown in FIG. 1A, and by reference number 105, the first network device may receive, from the first mediation device, a request to install a first rule set associated with multiple rules. The multiple rules may include a rule identifying a first field bit offset associated with a received packet (e.g., a bit offset of a field associated with the received packet), a rule identifying a first length of the field associated with the received packet, a rule identifying a first value of the field associated with the received packet, a rule identifying a first operator of the field associated with the received packet (e.g., equal to, in a range, in a set, a looping operator, and/or the like), a rule identifying a first inter-rule set operator of the field associated with the received packet (e.g., a logical AND, a logical OR, and/or the like), and/or the like.

The first mediation device may include a device that requests specific traffic (e.g., electronic data and/or voice data transferred over the network) to be monitored based on the first rule set. A user of the first mediation device may define the multiple rules in the first rule set based on input to a script or a graphical user interface (GUI). For example, the script and/or the GUI may include fields (e.g., an Ether type field, an Internet protocol (IP) version 4 (IPv4) source address field, an IPv4 destination address field, an IP version 6 (IPv6) source address field, an IPv6 destination address, and/or the like) with all possible protocol headers. The script and/or the GUI may enable the user of the first mediation device to define rules and/or rule sets that capture tunneled traffic, such as traffic received via a multiprotocol label switching (MPLS) tunnel, an IP-in-IP tunnel, an MPLS over generic routing encapsulation (GRE) tunnel, a Dual-Stack Lite (DS-Lite) tunnel, an MPLS over user datagram protocol (UDP) tunnel, a Layer 3 virtual private network (L3VPN) tunnel, a Layer 2 virtual private network (L2VPN) tunnel, and/or the like. In this way, the rules and the rule sets enable the first network device to capture traffic independent of protocols associated with the captured traffic, to capture traffic with a transmission control protocol (TCP) synchronize (SYN) flag set, to capture five tuple-based traffic, and/or the like.

In a first example, if the user of the first mediation device wishes to capture packets based on an inner source address of IPv4-in-IPv6 tunneled packets, the user may utilize the script and/or the GUI to configure a rule set that captures such packets. The script and/or the GUI may support construction of different kinds of protocol stacks. The user of the first mediation device may utilize the script or the GUI to select relevant fields with values based on packets to be captured. In this example, the user may select an Ether type to be equal to 0x86dd (IPv6), an IPv6 next header to be equal to 4 (e.g., representing IPv4), an IPv4 source address to be in a range between 20.1.1.0 to 20.1.1.255, and/or the like. The first mediation device may derive corresponding other fields (e.g., a field bit offset, a length, relevant operators, and/or the like) based on the selected fields. The rule set defined by the user (e.g., Rule-Set1) may include the following information:

Rule-Set1={

(Bit offset(ether type)=384,value0x86dd,
        length=16bits, operator=is-equal)

AND (Bit offset(*IPv6* Next Header)=768, value=4,
        length=8 bits, operator=is-equal)

AND (Bit offset(Inner *IPv4* Source Address)=1920,
        value=20·1·1·0-20·1·1·255, length=32 bits,
        operator=in-range)

}

The first mediation device may provide the rule set to the first network device via a new field (e.g., X-JTap-Rule-Set, shown in bold) provided in the request:

ADD DTCP/0.8
    Csource-ID: ftap1
    Cdest-ID: cd1
    Priority: 2
    Flags: Static
    X-JTap-Cdest-Dest-Address: 212.25.99.82
    X-JTap-Cdest-Dest-Port: 8001
    X-JTap-Cdest-Source-Address: 208.223.208.9
    X-JTap-Cdest-Source-Port: 49153

X-JTap-Rule-Set: Rule-Set1
X-JTap-Cdest-TTL: 255
Seq: 1
Authentication-Info:
    e654b54414cabeedfd1266bc111971f365fe3314
The first network device may install the rule set and may capture packets based on the rule set, as described below.

In a second example and in addition to the scenario described above for the first example, if the user of the first mediation device wishes to capture plane IPv4 packets with source IPv4 addresses in a specific range, then user may define another rule set along with the rule set (e.g., defined in the first example) using an inter rule-set operator.

In some implementations, the request to install the first rule set may prevent identification of the first mediation device that generated the request to install the first rule set. For example, the first mediation device may not be identified for security reasons, but may be permitted to access the network via a security mechanism (e.g., a security login). In some implementations, the first network device may provide, to the first mediation device, a response confirming that the request was received.

In some implementations, the first mediation device may send the request to install the first rule set via a secure protocol (e.g., a dynamic tasking control protocol (DTCP)), and the first network device may receive the request to install the first rule set via the DTCP. DTCP is a secure protocol that utilizes a message-based interface by which an authorized client can connect to a network device and issue dynamic requests for data. Such a request may contain, among other parameters, packet matching criteria that may apply to certain packets flowing through the network device, and may instruct the network device to perform mirroring (e.g., to send copies of packets matching the criteria to a specified location for further inspection or other action). Additionally, DTCP contains a security architecture to address client or server spoofing, as well as replay prevention.

In some implementations, the first mediation device may send the request as a DTCP ADD message. A DTCP ADD message may trigger mirroring of network traffic (e.g., matching the first rule set criteria) by the first network device, and may include fields that trigger the first network device to begin mirroring packets, fields that identify where to send the mirrored packets, and/or the like. The DTCP ADD message may additionally include one or more fields that instruct the first network device to filter traffic that satisfies the multiple rules included in the first rule set.

As further shown in FIG. 1A, and by reference number 110, the first network device may receive, from the second mediation device, a request to install a second rule set associated with multiple rules. The second rule set may include the features described in connection with the first rule set. The second mediation device may include a device that requests specific traffic (e.g., electronic data and/or voice data transferred over the network) to be monitored based on the second rule set. In some implementations, the request to install the second rule set may prevent identification of the second mediation device that generated the request to install the second rule set. For example, the second mediation device may not be identified for security reasons, but may be permitted to access the network via a security mechanism (e.g., a security login). In some implementations, the first network device may provide, to the second mediation device, a response confirming that the request was received.

In some implementations, the second mediation device may send the request to install the second rule set via a DTCP, and the first network device may receive the request to install the second rule set via the DTCP, in a manner similar to that described above with respect to the first mediation device. In some implementations, the second mediation device may send the request as a DTCP ADD message. A DTCP ADD message may trigger mirroring of network traffic (e.g., matching the second rule set criteria) by the first network device, and may include fields that trigger the first network device to begin mirroring packets, fields that identify where to send the mirrored packets, and/or the like. The DTCP ADD message may additionally include one or more fields that instruct the first network device to filter traffic that satisfies the multiple rules included in the second rule set.

Although FIG. 1A shows two mediation devices, in practice, the first network device may be associated with hundreds, thousands, and/or the like of mediation devices, and the mediation devices may be associated with hundreds, thousands, and/or the like of law enforcement authorities.

Figure 1B:
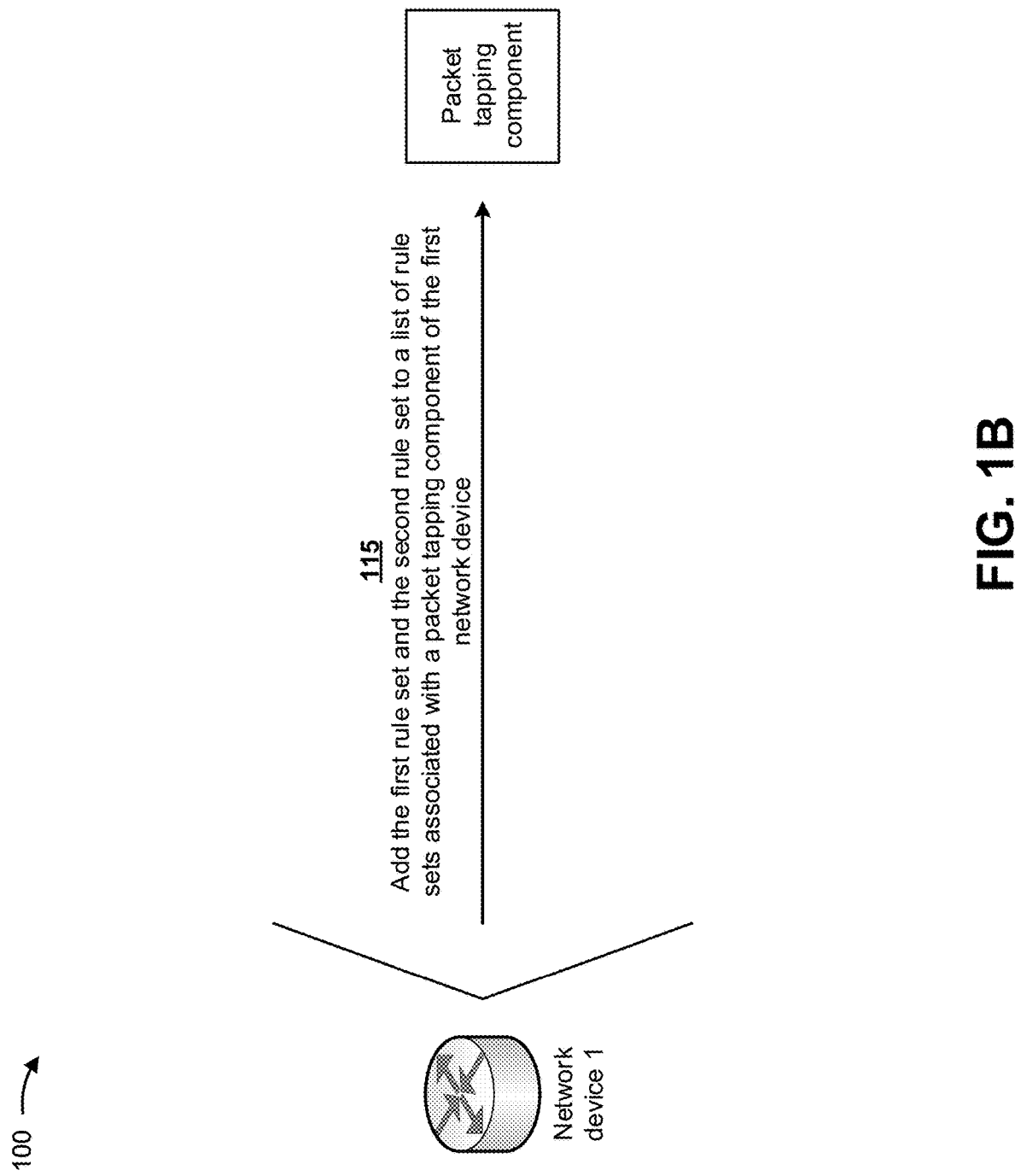

As shown in FIG. 1B, and by reference number 115, the first network device may add the first rule set and the second rule set to a list of rule sets associated with a packet tapping component (e.g., that performs deep packet inspection and packet tapping of packets, described below) of the first network device. For example, the first network device may store the first rule set and the second rule set in a data structure, associated with the first network device, that maintains hundreds, thousands, millions, and/or the like of different rule sets. In this way, the first network device may implement rule sets that can identify packets, independent of protocols utilized for the packets, that particular law enforcement authorities wish to monitor. In some implementations, rule sets installed for one entity (e.g., a law enforcement authority corresponding to one mediation device) may not be visible to other entities (e.g., other law enforcement authorities corresponding to other mediation devices), and the first network device may not reveal identities of monitored targets.

Figure 1C:
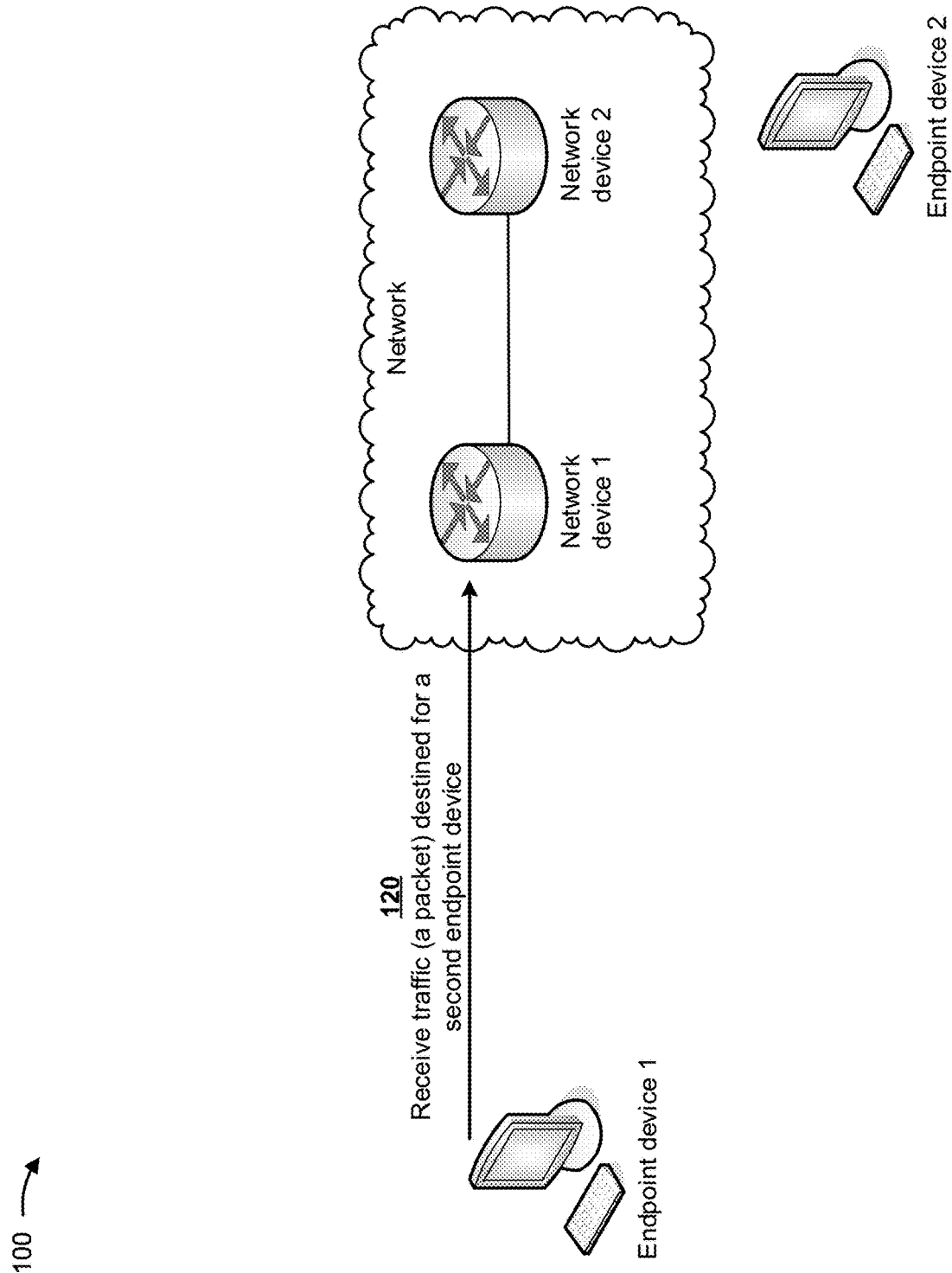

As shown in FIG. 1C, and by reference number 120, the first network device may receive, from a first endpoint device (e.g., endpoint device 1), traffic (e.g., a packet) destined for a second endpoint device (e.g., endpoint device 2). The first endpoint device may be a source device providing electronic data and/or voice data over the network, and the second endpoint device may be a destination device for the electronic data and/or voice data. In some implementations, the first endpoint device and the second endpoint device may be parties to a voice conversation; the first endpoint device may include a server and the second endpoint device may include a client served by the server via electronic data transmitted over the network; the first endpoint device and the second endpoint device may be parties to a short message service (SMS) text message conversation; and/or the like. In some implementations, the packet may include signaling information (e.g., information for establishing, controlling, and/or terminating a communication, such as a telephone call), network management information (e.g., network performance information, network provisioning information, network quality of service information, and/or the like), content of communications, and/or the like.

Figure 1D:
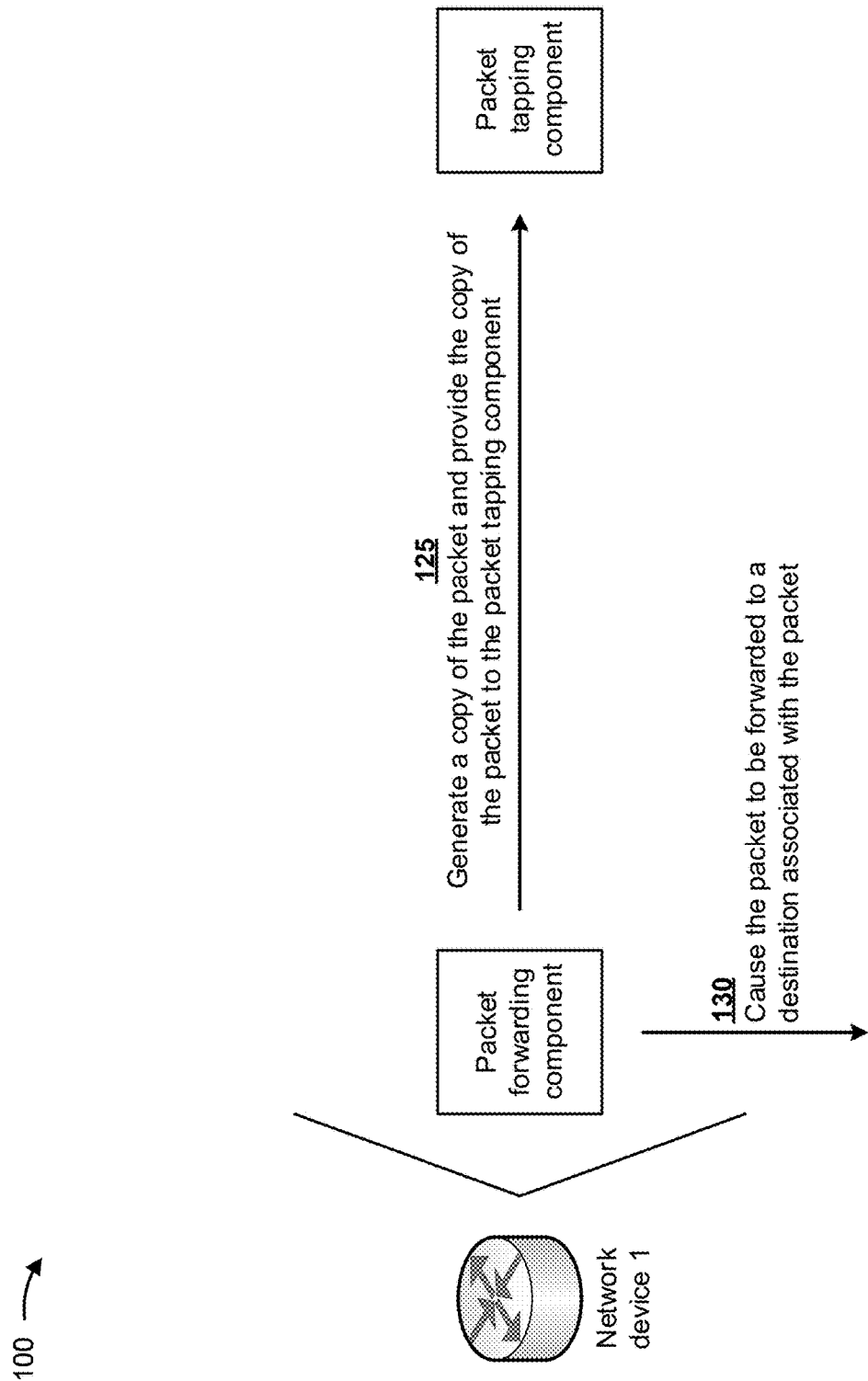

As shown in FIG. 1D, and by reference number 125, a packet forwarding component of the first network device may generate a copy of the packet received from the first endpoint device, and may provide the copy of the packet to the packet tapping component. In some implementations, the packet forwarding component may filter a particular type of packet (e.g., content for which lawful interception is expected to be warranted and/or appropriate, such as an Internet search, a telephone call, a text messaging session, and/or the like), and may only copy the particular type of packet. In this way, the first network device conserves computing resources (e.g., processing resources, memory resources, and/or the like) that would otherwise be wasted copying and monitoring packets for which lawful interception is unlikely to be warranted or appropriate. Alternatively, the packet forwarding component may copy all packets received by the first network device (e.g., depending on traffic load associated with the first network device), and may provide the copies of all packets received to the packet tapping component, which may conserve computing resources that would otherwise be wasted filtering packets prior to packet tapping during light traffic load conditions.

As further shown in FIG. 1D, and by reference number 130, the packet forwarding component may cause the packet to be forwarded toward a destination associated with the packet. For example, the packet forwarding component may cause the packet to be forwarded toward the second endpoint device.

Figure 1E:
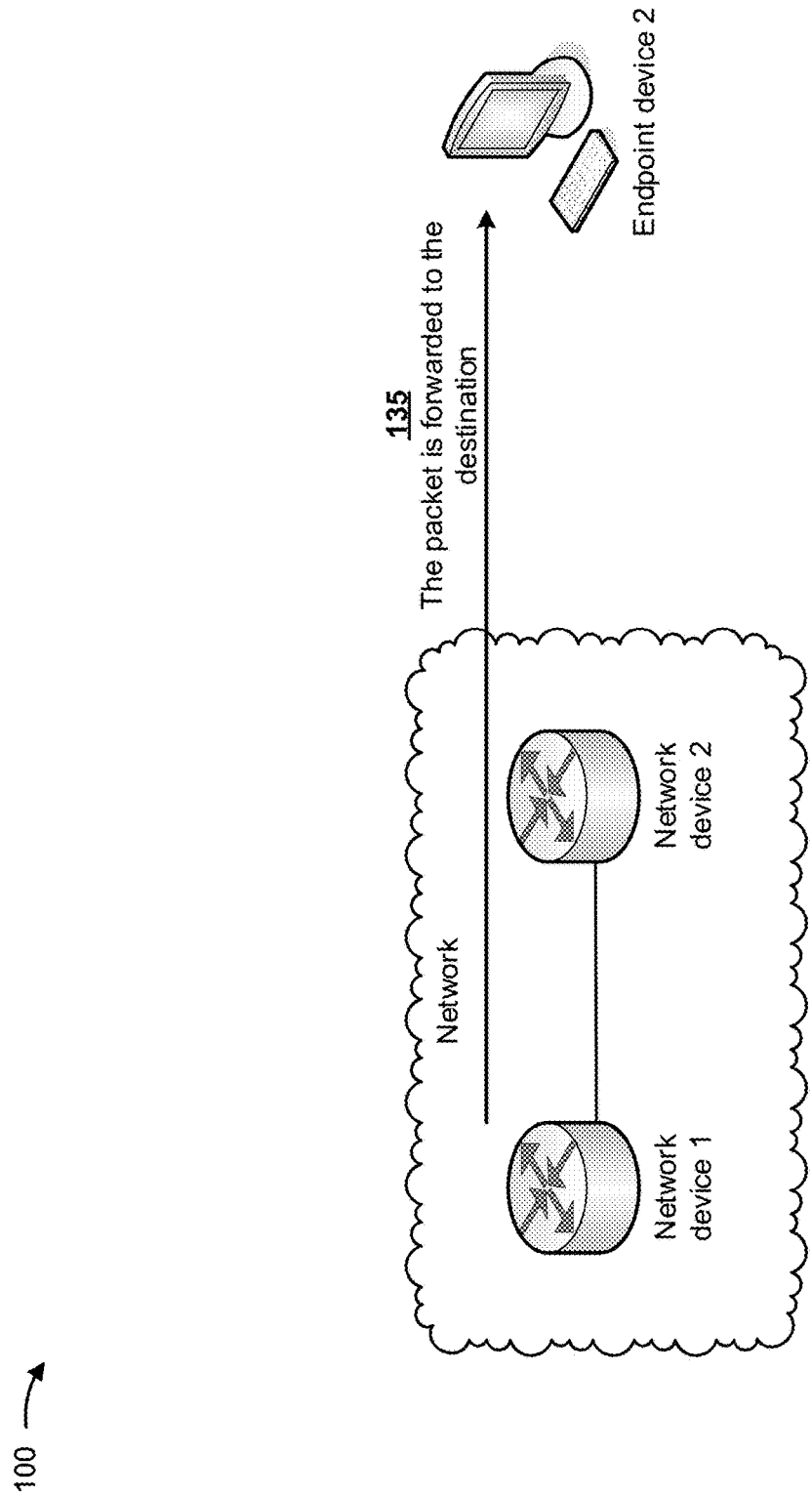

As shown in FIG. 1E, and by reference number 135, the first network device (e.g., the packet forwarding component) may cause the packet to be forwarded toward the destination (e.g., the second endpoint device) associated with the packet. For example, the first network device may forward the packet to the second network device, and the second network device may forward the packet to the second endpoint device. In this way, communication may continue between the first endpoint device and the second endpoint device without being disrupted by packet tapping or monitoring operations. This improves network operations over a technique that inspects packets without copying the packets.

Figure 1F:
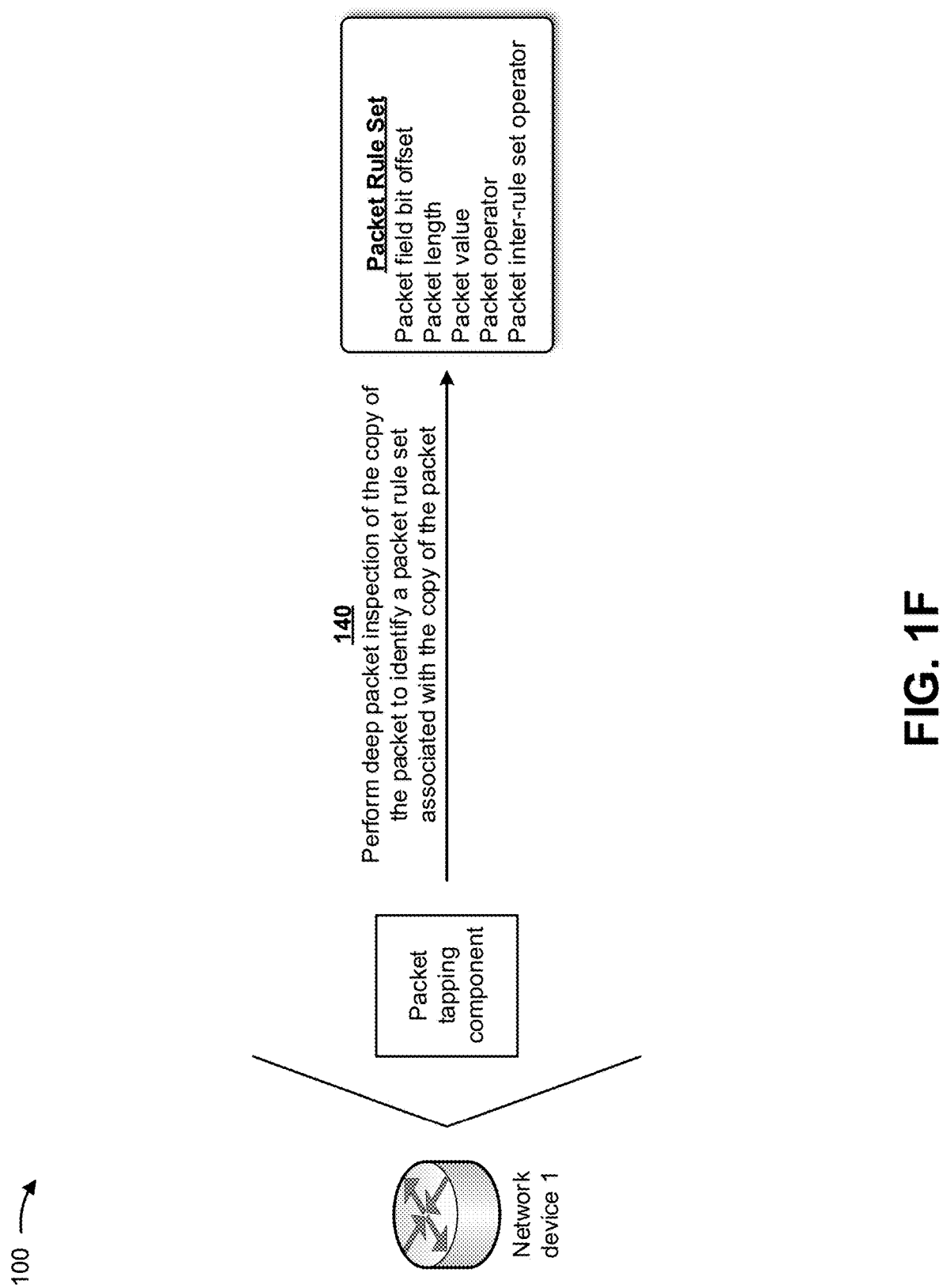

As shown in FIG. 1F, and by reference number 140, a packet tapping component of the first network device may perform deep packet inspection of the copy of the packet to identify a packet rule set associated with the copy of the packet. Deep packet inspection is an advanced method of packet filtering, and may function, for example, at the application layer of the Open Systems Interconnection (OSI) reference model. Deep packet inspection can be used to find, identify, classify, reroute, block, and/or the like packets with specific data and/or payloads (e.g., that conventional packet filtering, which examines only packet headers, cannot detect). Deep packet inspection may examine content of a packet passing through a network device and may make real-time decisions based on rules assigned by an entity (e.g., an Internet service provider (ISP), a network operator, a law enforcement authority, and/or the like), depending on the content of the packet. For example, deep packet inspection may examine content of messages and identify from which specific application or service the messages were generated.

As further shown in FIG. 1F, the packet rule set may include multiple packet rules, such as a packet rule identifying a first field bit offset associated with a received packet, a packet rule identifying a first length of the field associated with the received packet, a packet rule identifying a first value of the field associated with the received packet, a packet rule identifying a first operator of the field associated with the received packet, a packet rule identifying a first inter-rule set operator of the field associated with the received packet, and/or the like.

Figure 1G:
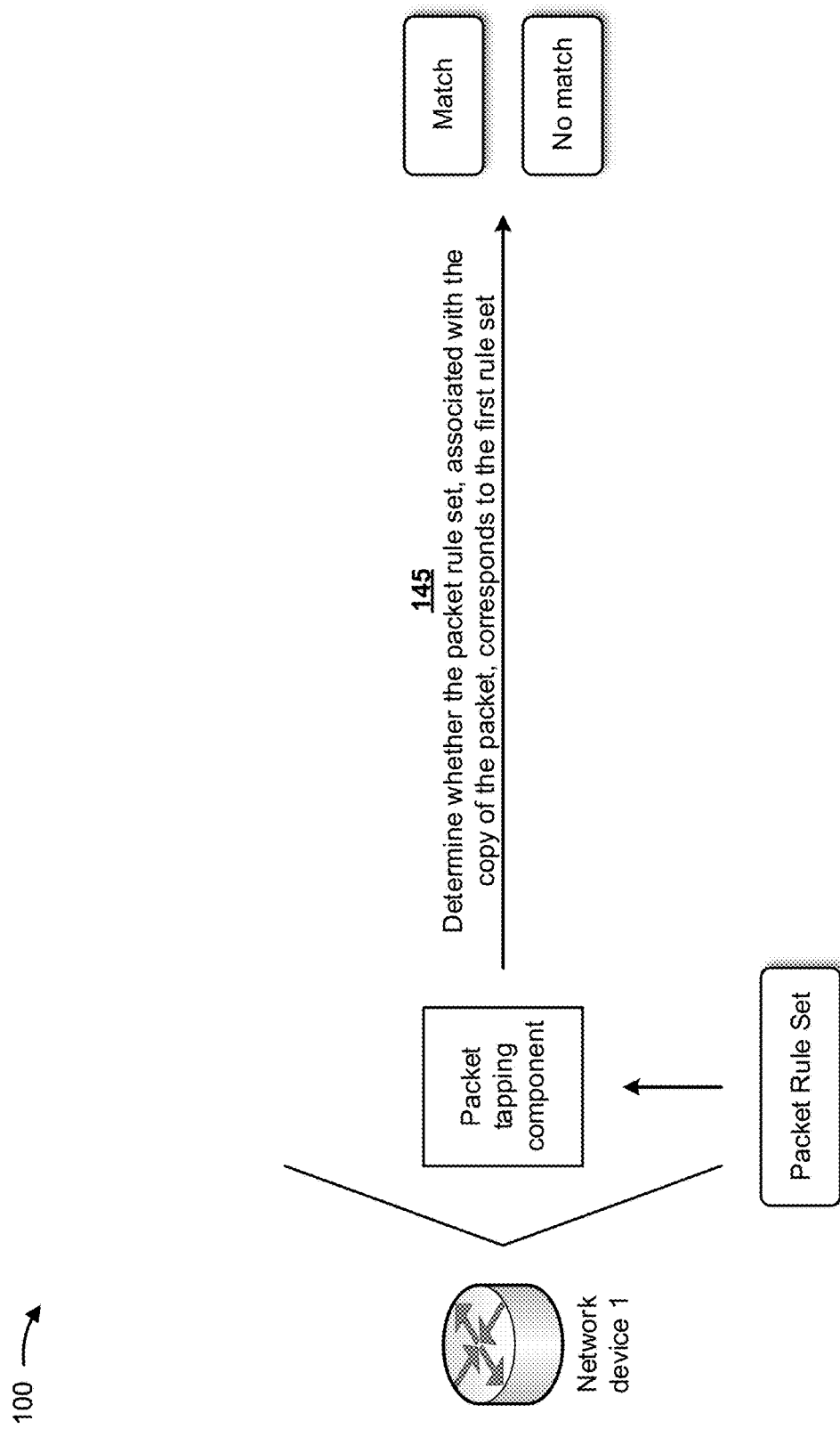

As shown in FIG. 1G, and by reference number 145, the packet tapping component of the first network device may determine whether the packet rule set associated with the copy of the packet matches or corresponds to the first rule set. In some implementations, the packet tapping component may determine that the packet rule set matches or corresponds to the first rule set when all of rules in both sets are equivalent, when one or more of the rules in both sets are equivalent, when a threshold quantity of rules in both sets are equivalent, and/or the like.

In some implementations, the packet tapping component may include an adaptive services physical interface card that is configured to perform packet tapping. Packet tapping may include monitoring traffic on a network in order to aid analysis of the network traffic. For example, a third party (e.g., a law enforcement authority) may wish to monitor traffic between two points in a network. If the network between the two points includes a network device, the network device may function as a network tap that enables the monitoring by the third party. Alternatively, if the network between the two points does not include a network device, a new network device may be installed between the two points as the network tap. For example, the packet tapping component of the first network device may compare information in the list of rule sets (e.g., which includes the first rule set) with the copy of the packet, and may determine whether the packet rule set associated with the copy of the packet matches or corresponds to the first rule set. The packet tapping component may determine a match or a no match based on this determination.

Figure 1H:
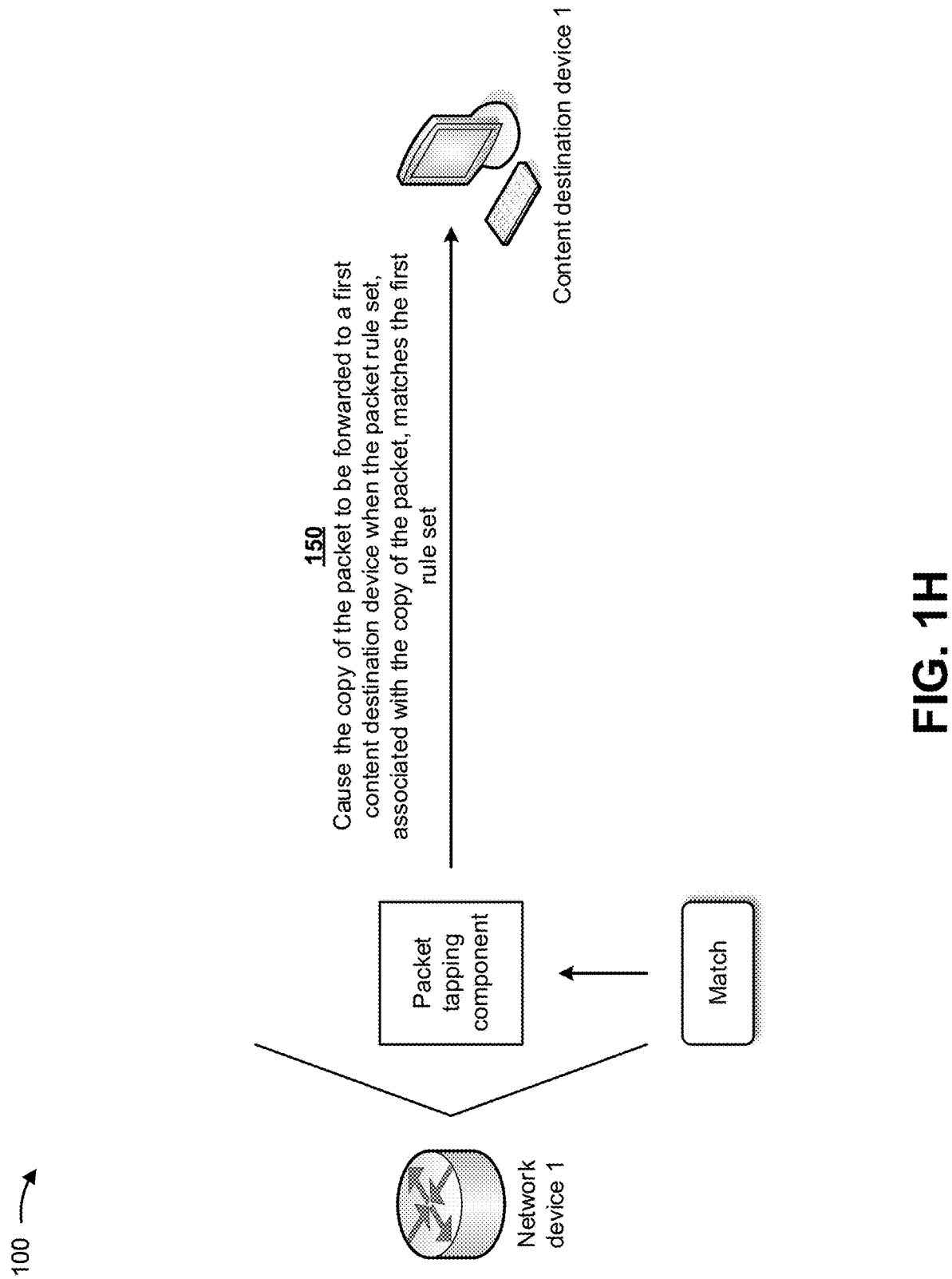

As shown in FIG. 1H, and by reference number 150, if the packet rule set associated with the copy of the packet matches or corresponds to the first rule set, the packet tapping component of the first network device may cause the copy of the packet to be forwarded to a first content destination device (e.g., content destination device 1). As described above, a location (e.g., an address and/or a port) associated with the first content destination device may be provided with the request to add the first rule set. The packet tapping component may utilize this location to cause the copy of the packet to be forwarded to the first content destination device. In some implementations, the packet tapping component of the first network device may cause the copy of the packet to be securely forwarded to the first content destination device via an encapsulation technique (e.g., Internet Protocol (IP)-User Datagram Protocol (UDP) encapsulation), may cause the copy of the packet to be securely forwarded to another network device connected to the first content destination device via an IP security tunnel, and/or the like.

In some implementations, if the packet rule set associated with the copy of the packet fails to match or correspond to the first rule set, the packet tapping component of the first network device may prevent the copy of the packet from being forwarded to the first content destination device. For example, the packet tapping component may cause the copy of the packet to be discarded and may not forward the copy of the packet to the first content destination device, conserving resources that would be wasted transmitting an unnecessary packet to a content destination device that will discard the packet.

In some implementations, the first content destination device may be associated with a law enforcement authority authorized to perform lawful interception. For example, the first content destination device may be associated with a same law enforcement authority that is associated with the first mediation device that provided the request to install the first rule set. In some implementations, the first mediation device and the first content destination device may be physically located on a same host system or device. Alternatively, the first mediation device and the first content destination device may be physically located on different host systems or devices. In some implementations, receipt of the copy of the packet may cause the first content destination device to analyze the copy of the packet.

Figure 1I:
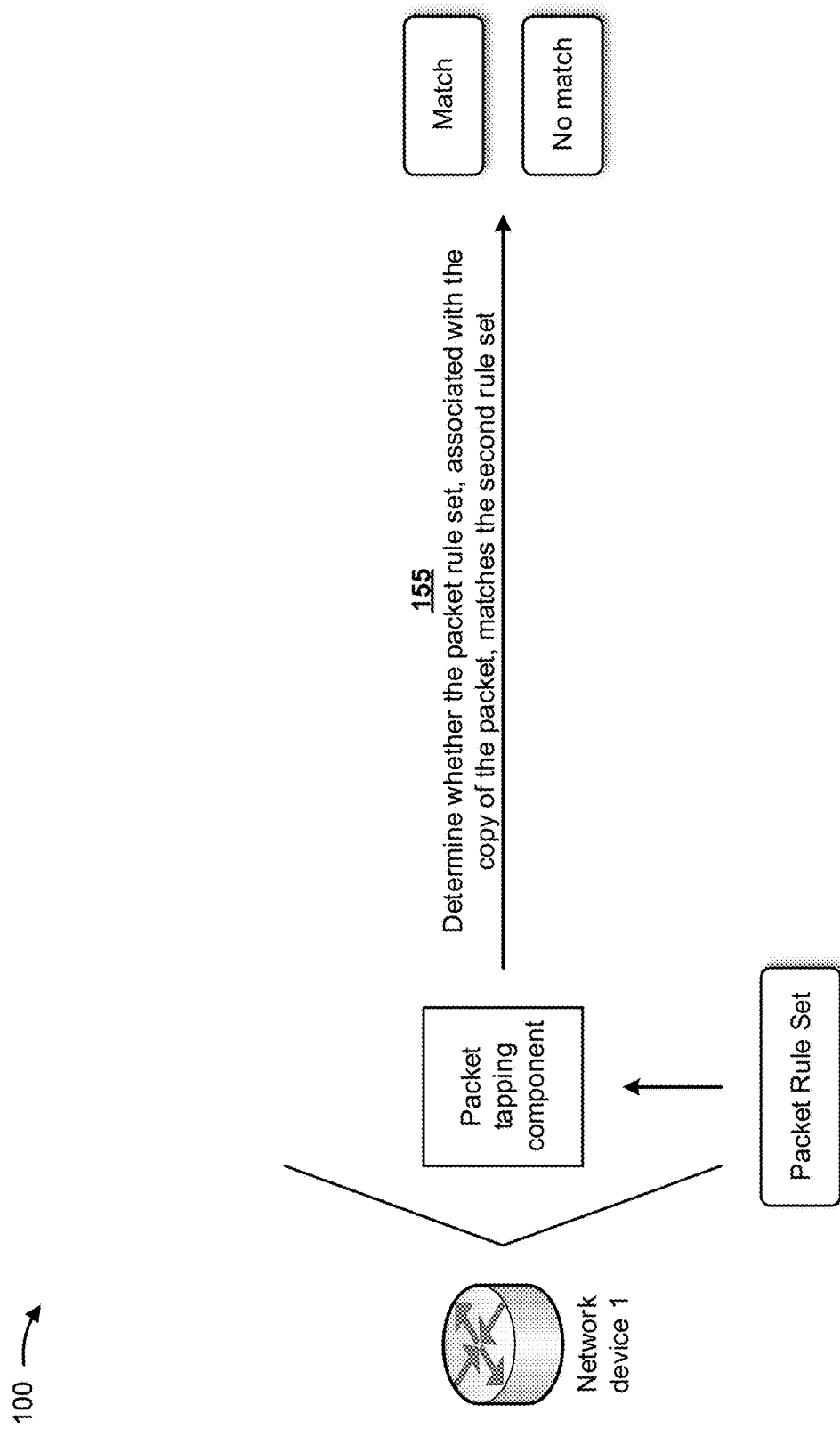

As shown in FIG. 1I, and by reference number 155, the packet tapping component of the first network device may determine whether the packet rule set associated with the copy of the packet matches or corresponds to the second rule set. For example, the packet tapping component of the first network device may compare information in the list of rule sets (e.g., which includes the second rule set) with the copy of the packet, and may determine whether the packet rule set associated with the copy of the packet matches or corresponds to the second rule set. The packet tapping component may determine a match or a no match based on this determination.

Figure 1J:
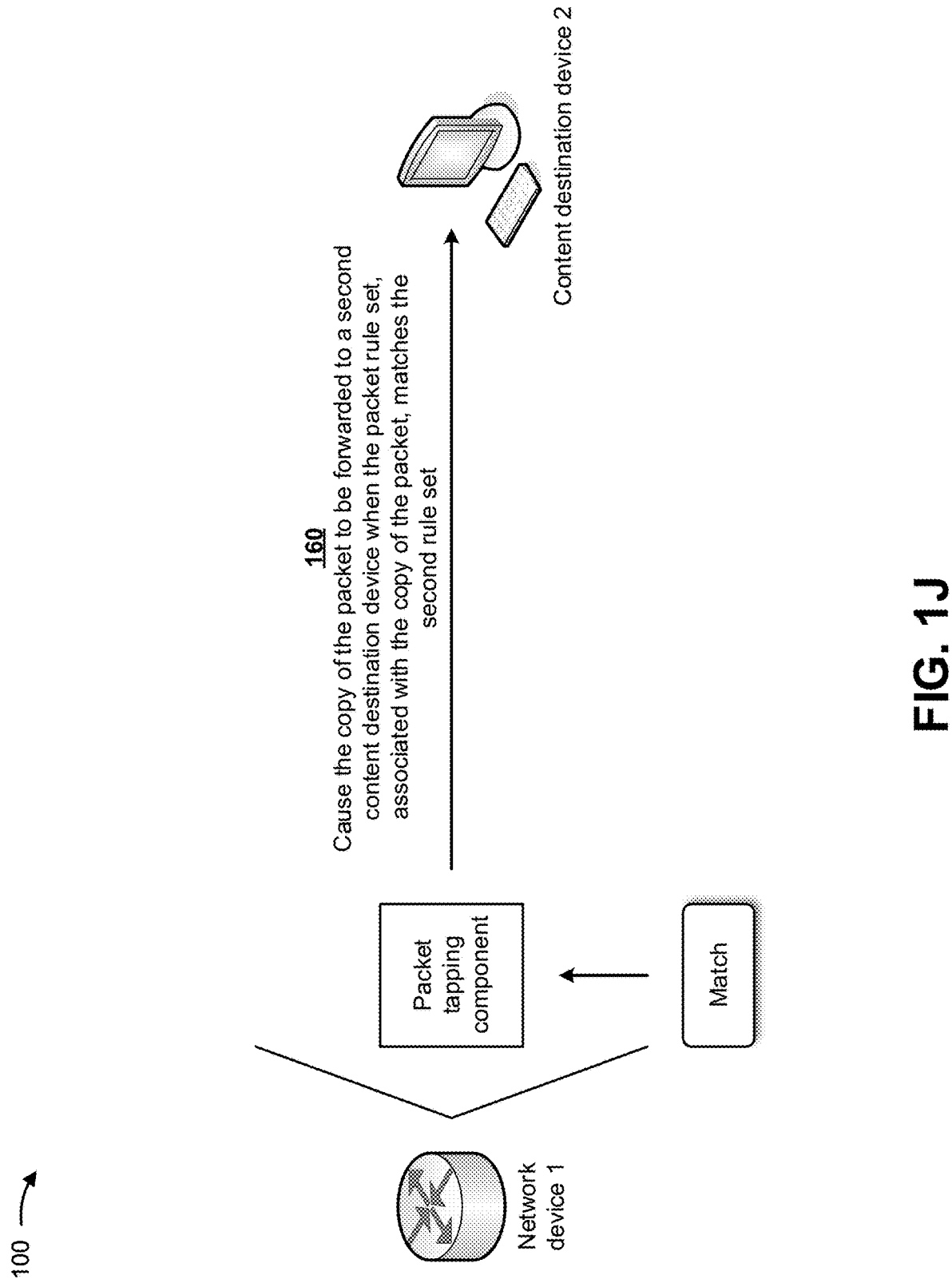

As shown in FIG. 1J, and by reference number 160, if the packet rule set associated with the copy of the packet matches or corresponds to the second rule set, the packet tapping component of the first network device may cause the copy of the packet to be forwarded to a second content destination device (e.g., content destination device 2). As described above, a location (e.g., an address and/or a port) associated with the second content destination device may be provided with the request to add the second rule set. The packet tapping component may utilize this location to cause the copy of the packet to be forwarded to the second content destination device. In some implementations, the packet tapping component of the first network device may cause the copy of the packet to be securely forwarded to the second content destination device via an encapsulation technique (e.g., IP-UDP encapsulation), may cause the copy of the packet to be securely forwarded to another network device connected to the second content destination device via an IP security tunnel, and/or the like.

In some implementations, if the packet rule set associated with the copy of the packet fails to match or correspond to the second rule set, the packet tapping component of the first network device may prevent the copy of the packet from being forwarded to the second content destination device. For example, the packet tapping component may cause the copy of the packet to be discarded and may not forward the copy of the packet to the second content destination device.

In some implementations, the second content destination device may be associated with a law enforcement authority authorized to perform lawful interception. For example, the second content destination device may be associated with a same law enforcement authority that is associated with the second mediation device that provided the request to install the second rule set. In some implementations, the second mediation device and the second content destination device may be physically located on a same host system or device. Alternatively, the second mediation device and the second content destination device may be physically located on different host systems or devices. In some implementations, receipt of the copy of the packet may cause the second content destination device to analyze the copy of the packet.

Although FIGS. 1H and 1J collectively show two content destination devices, in practice, the first network device may be associated with hundreds, thousands, and/or the like of content destination devices, and the content destination devices may be associated with hundreds, thousands, and/or the like of law enforcement authorities. Furthermore, although implementations describe filtering based on rule sets, in some implementations, network traffic may be filtered based on other information, such as a user identifier, an end point device identifier, a network address (e.g., an IP address), an account identifier, transaction card identifier, and/or the like.

In some implementations, the packet tapping component may compare the copy of the packet to all rule sets included in the list of rule sets, and may generate additional copies of the packet if the copy of the packet matches more than one rule set (e.g., as many copies of the packet as match to the rule sets). The first network device may then forward the multiple copies of the packet to respective content destination devices. Furthermore, hundreds or thousands of rule sets may be included in the list of rule sets, and the packet tapping component may compare the packet rule set with each rule set included in the list of rule sets. In some implementations, the packet tapping component may arrange the list of rule sets in a particular order that may enable efficient comparison of the packet rule set with each rule set. If the packet rule set matches zero rule sets in the list of rule sets, the packet tapping component may discard the copy of the packet. If the packet rule set matches more than one rule set in the list of rule sets, the packet tapping component may make additional copies of the packet and may forward the copy of the packet and the additional copies of the packet to appropriate content destination devices.

In this way, network traffic may be intercepted for analysis based on rule sets associated with the traffic and independently of traffic protocols, which reduces or prevents law enforcement authorities from needing to capture all traffic received by network devices and filtering the traffic for traffic of interest, and/or the like. This conserves computing resources (e.g., processing resources, memory resources, and/or the like), networking resources, and/or the like that would otherwise be wasted in storing all of the traffic (e.g., in memory resources), transporting all of the traffic (e.g., via networking resources), filtering all of the traffic (e.g., via processing resources), and/or the like. Furthermore, implementations described herein use a rigorous, computerized process to perform tasks that were not previously performed. For example, currently there does not exist a technique that enables a network device to lawfully intercept traffic for analysis independent of a protocol associated with the traffic.

As indicated above, FIGS. 1A-1J are provided merely as examples. Other examples may differ from what is described with regard to FIGS. 1A-1J.

Figure 2:
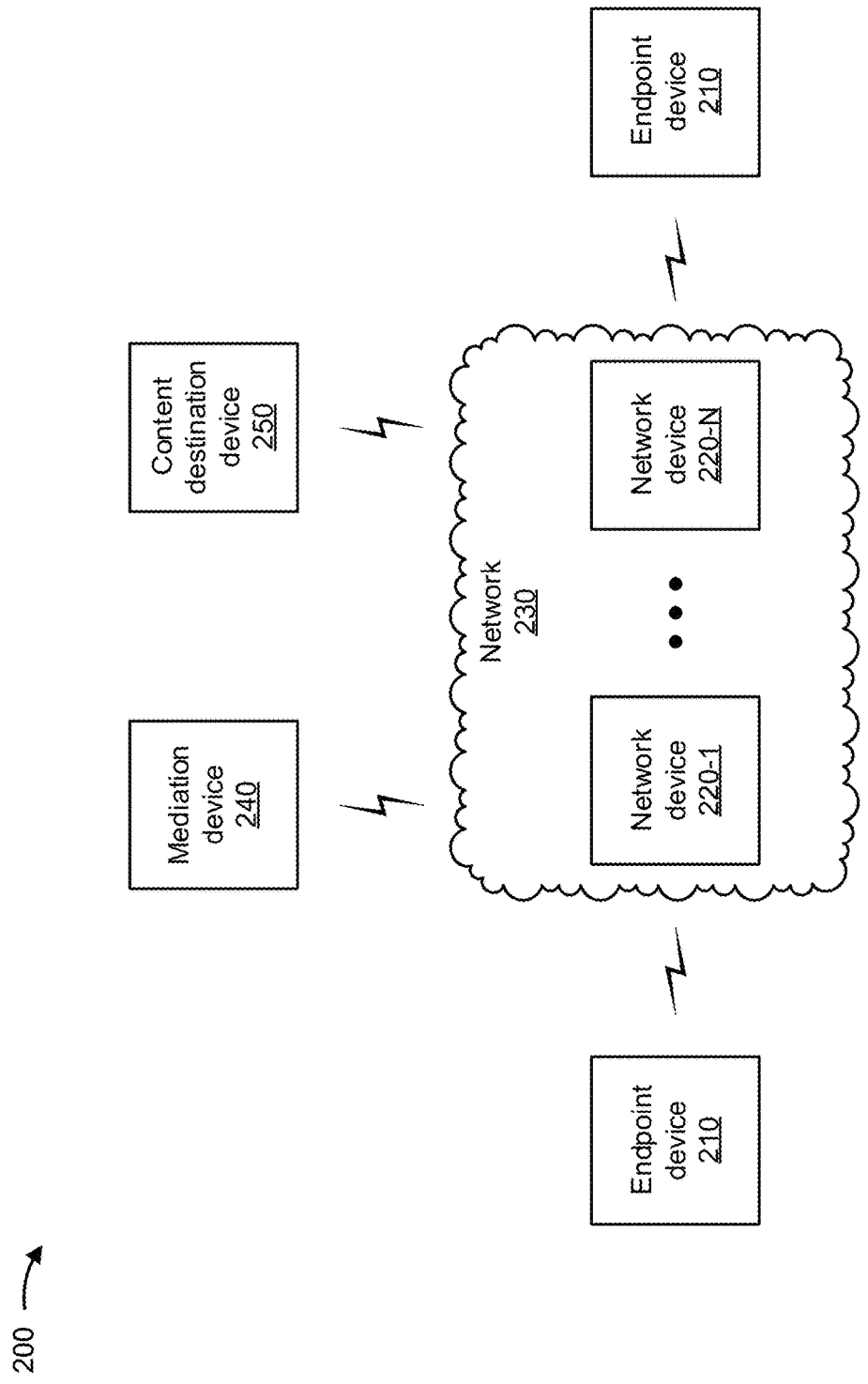
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include multiple endpoint devices 210, a group of network devices 220 (shown as network device 220-1 through network device 220-N), a network 230, a mediation device 240, and a content destination device 250. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), a network device, or a similar type of device. In some implementations, endpoint device 210 may receive network traffic from and/or may provide network traffic to other endpoint devices 210, via network 230 (e.g., by routing packets using network devices 220 as intermediaries).

Network device 220 includes one or more devices capable of receiving, processing, storing, routing, and/or providing traffic (e.g., a packet, other information or metadata, and/or the like) in a manner described herein. For example, network device 220 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 220 may include a gateway, a switch, a firewall, a hub, a bridge, a reverse proxy, a server (e.g., a proxy server, a cloud server, a data center server, and/or the like), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 230.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Mediation device 240 includes one or more devices capable of receiving, generating, storing, processing, and/or providing information, such as information described herein. For example, mediation device 240 may include a laptop computer, a tablet computer, a desktop computer, a group of server devices, or a similar type of device. Mediation device 240 may be associated with one or more law enforcement authorities (e.g., police departments, government agencies, and/or the like) and may be utilized by the law enforcement authorities to request, from network 230, particular traffic that is to be monitored for the purpose of analysis and/or evidence. In some implementations, mediation device 240 may receive information from and/or transmit information to endpoint device 210 and/or content destination device 250.

Content destination device 250 includes one or more devices capable of receiving, generating, storing, processing, and/or providing information, such as information described herein. For example, content destination device 250 may include a laptop computer, a tablet computer, a desktop computer, a group of server devices, or a similar type of device. Content destination device 250 may be associated with one or more law enforcement authorities and may be utilized by the law enforcement authorities to receive, from network 230, particular traffic that is to be monitored for the purpose of analysis and/or evidence. In some implementations, content destination device 250 may receive information from and/or transmit information to endpoint device 210 and/or mediation device 240.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
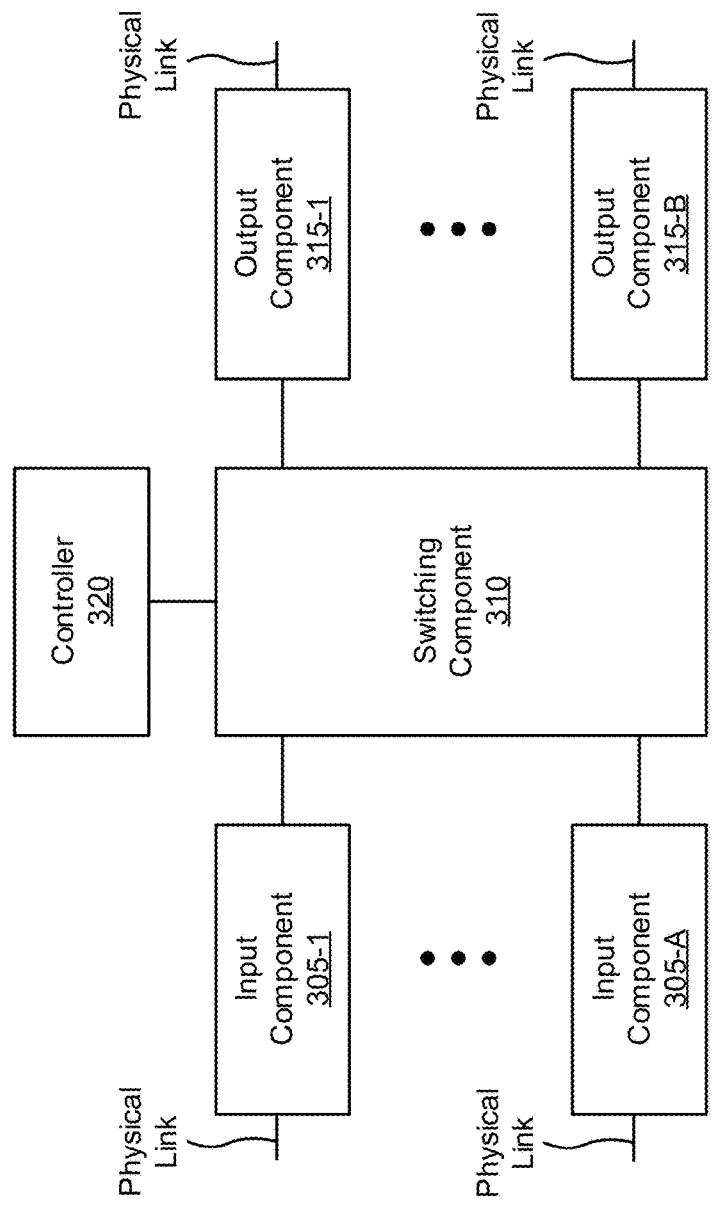
FIGS. 3 and 4 are diagrams of example components of one or more devices of FIG. 2.

FIG. 3 is a diagram of example components of a device 300. Device 300 may correspond to network device 220. In some implementations, network device 220 may include one or more devices 300 and/or one or more components of device 300. As shown in FIG. 3, device 300 may include one or more input components 305-1 through 305-A (A≥1) (hereinafter referred to collectively as input components 305, and individually as input component 305), a switching component 310, one or more output components 315-1 through 315-B (B≥1) (hereinafter referred to collectively as output components 315, and individually as output component 315), and a controller 320.

Input components 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor or processing component. The processor is implemented in hardware, firmware, and/or a combination of software and hardware. In some implementations, controller 320 may include one or more processors that can be programmed to perform a function.

In some implementations, controller 320 may include a random-access memory (RAM), a read only memory (ROM), and/or another type of dynamic or static storage device (e.g., a flash memory, a magnetic memory, an optical memory, and/or the like) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets. In some cases, controller 320 may create a session table based on information determined while initializing a link fault detection session and may forward the session table to input components 305 and/or output components 315.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
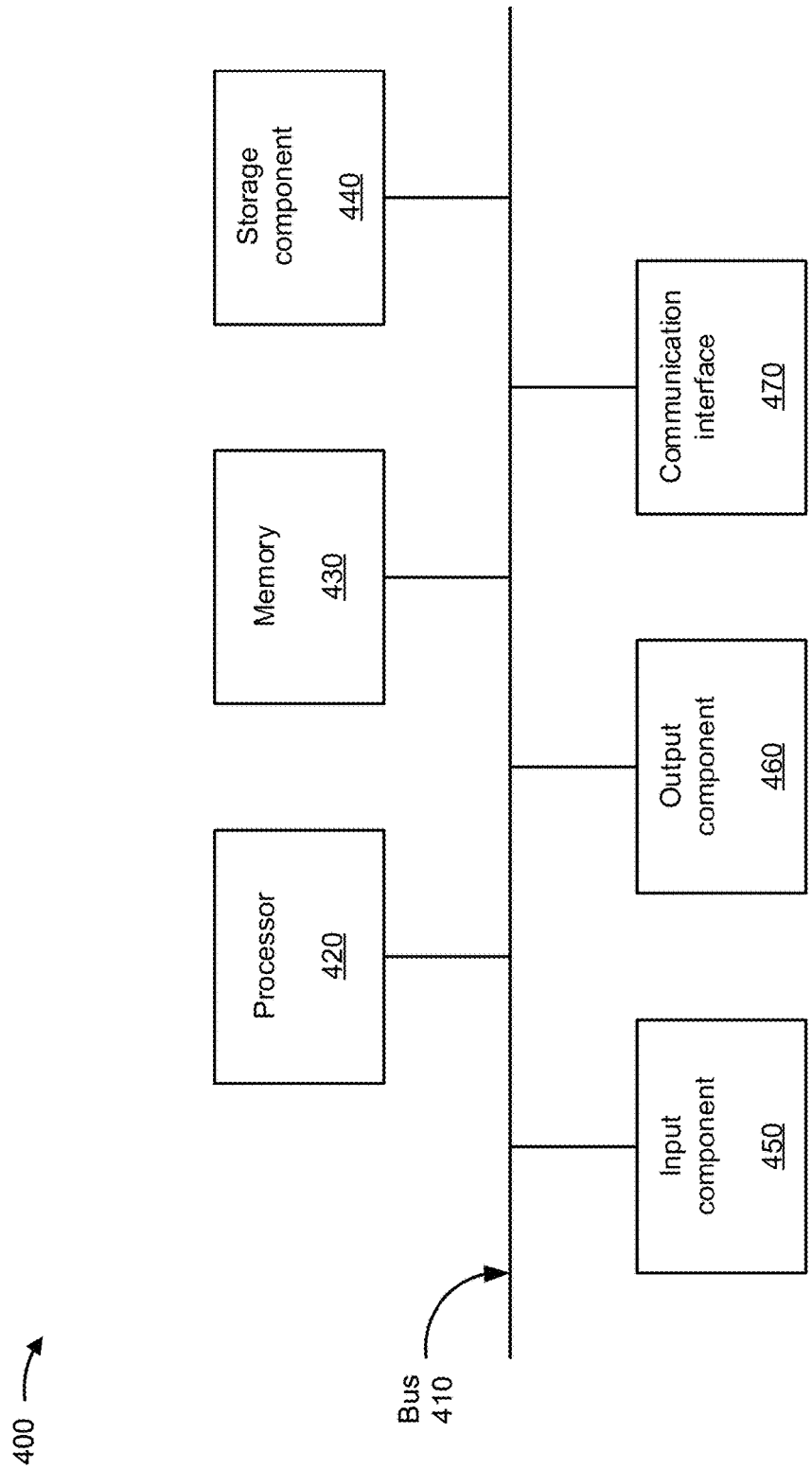

FIG. 4 is a diagram of example components of a device 400. Device 400 may correspond to endpoint device 210, network device 220, mediation device 240, and/or content destination device 250. In some implementations, endpoint device 210, network device 220, mediation device 240, and/or content destination device 250 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random-access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
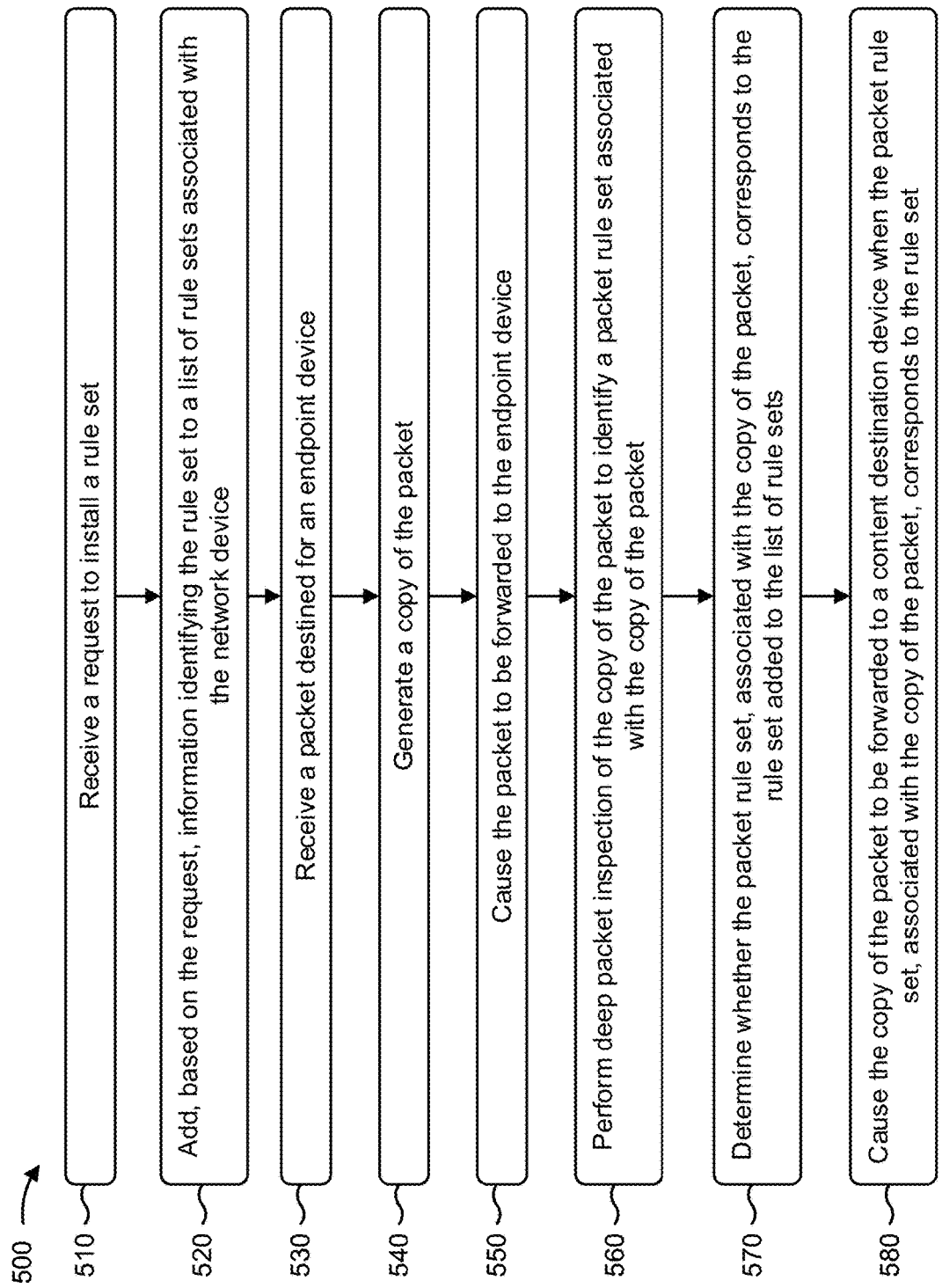
FIGS. 5-7 are flow charts of example processes for lawfully intercepting traffic for analysis independent of a protocol associated with the traffic.

FIG. 5 is a flow chart of an example process 500 for lawfully intercepting traffic for analysis based on an application identifier or a URL associated with the traffic. In some implementations, one or more process blocks of FIG. 5 may be performed by a network device (e.g., network device 220). In some implementations, one or more process blocks of FIG. 5 may be performed by another device or a group of devices separate from or including the network device, such as an endpoint device (e.g., endpoint device 210), a mediation device (e.g., mediation device 240), and/or a content destination device (e.g., content destination device 250).

As shown in FIG. 5, process 500 may include receiving a request to install a rule set (block 510). For example, the network device (e.g., using input component 305, switching component 310, controller 320, processor 420, communication interface 470, and/or the like) may receive a request to install a rule set, as described above.

As further shown in FIG. 5, process 500 may include adding, based on the request, information identifying the rule set to a list of rule sets associated with the network device (block 520). For example, the network device (e.g., using controller 320, processor 420, memory 430, and/or the like) may add, based on the request, information identifying the rule set to a list of rule sets associated with the network device, as described above.

As further shown in FIG. 5, process 500 may include receiving a packet destined for an endpoint device (block 530). For example, the network device (e.g., using input component 305, switching component 310, controller 320, processor 420, communication interface 470, and/or the like) may receive a packet destined for an endpoint device, as described above.

As further shown in FIG. 5, process 500 may include generating a copy of the packet (block 540). For example, the network device (e.g., using controller 320, processor 420, storage component 440, and/or the like) may generate a copy of the packet, as described above.

As further shown in FIG. 5, process 500 may include causing the packet to be forwarded to the endpoint device (block 550). For example, the network device (e.g., using switching component 310, output component 315, controller 320, processor 420, memory 430, communication interface 470, and/or the like) may cause the packet to be forwarded to the endpoint device, as described above.

As further shown in FIG. 5, process 500 may include performing deep packet inspection of the copy of the packet to identify a packet rule set associated with the copy of the packet (block 560). For example, the network device (e.g., using controller 320, processor 420, memory 430, and/or the like) may perform deep packet inspection of the copy of the packet to identify a packet rule set associated with the copy of the packet, as described above.

As further shown in FIG. 5, process 500 may include determining whether the packet rule set, associated with the copy of the packet, corresponds to the rule set added to the list of rule sets (block 570). For example, the network device (e.g., using controller 320, processor 420, storage component 440, and/or the like) may determine whether the packet rule set, associated with the copy of the packet, corresponds to the rule set added to the list of rule sets, as described above.

As further shown in FIG. 5, process 500 may include causing the copy of the packet to be forwarded to a content destination device when the packet rule set, associated with the copy of the packet, corresponds to the rule set (block 580). For example, the network device (e.g., using switching component 310, output component 315, controller 320, processor 420, memory 430, communication interface 470, and/or the like) may cause the copy of the packet to be forwarded to a content destination device when the packet rule set, associated with the copy of the packet, corresponds to the rule set, as described above.

Process 500 may include additional implementations, such as any single implementation or any combination of implementations described below and/or in connection with one or more other processes described elsewhere herein.

In a first implementation, process 500 may further include preventing the copy of the packet from being forwarded to the content destination device when the packet rule set, associated with the copy of the packet, fails to correspond to the rule set.

In a second implementation, alone or in combination with the first implementation, receiving the request to install the rule set may include receiving the request to install the rule set from a mediation device.

In a third implementation, alone or in combination with one or more of the first and second implementations, causing the copy of the packet to be forwarded to the content destination device may include causing the copy of the packet to be forwarded to the content destination device via Internet Protocol (IP)-User Datagram Protocol (UDP) encapsulation.

In a fourth implementation, alone or in combination with one or more of the first through third implementations, the copy of the packet may include one or more of signaling information, network management information, or content of communications.

In a fifth implementation, alone or in combination with one or more of the first through fourth implementations, causing the copy of the packet to be forwarded to the content destination device may include causing the copy of the packet to be forwarded to another network device connected to the content destination device via an Internet protocol (IP) security tunnel.

In a sixth implementation, alone or in combination with one or more of the first through fifth implementations, receiving the request to install the rule set may include receiving the request to install the rule set via a dynamic tasking control protocol (DTCP).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
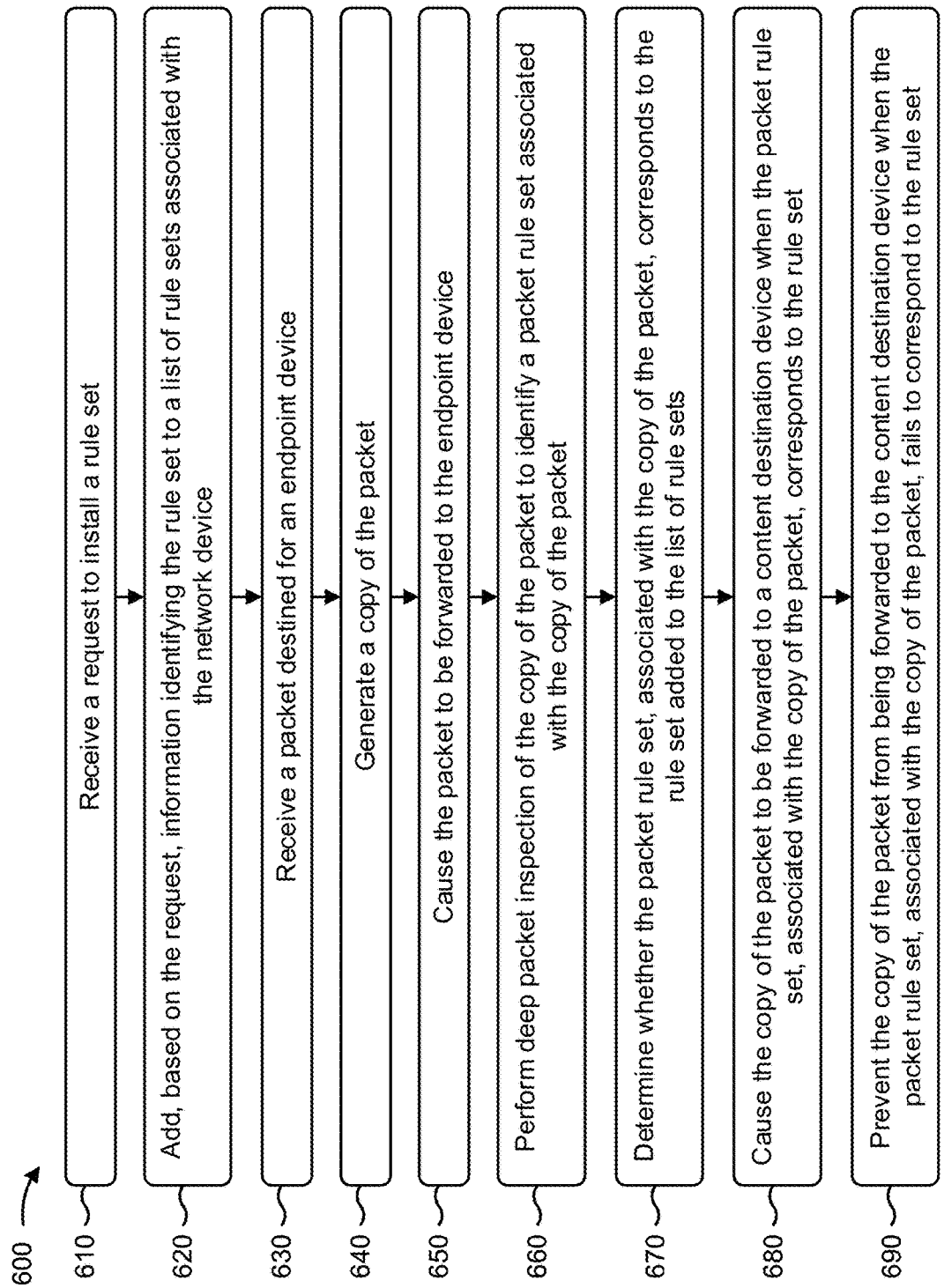

FIG. 6 is a flow chart of an example process 600 for lawfully intercepting traffic for analysis based on an application identifier or a URL associated with the traffic. In some implementations, one or more process blocks of FIG. 6 may be performed by a network device (e.g., network device 220). In some implementations, one or more process blocks of FIG. 6 may be performed by another device or a group of devices separate from or including the network device, such as an endpoint device (e.g., endpoint device 210), a mediation device (e.g., mediation device 240), and/or a content destination device (e.g., content destination device 250).

As shown in FIG. 6, process 600 may include receiving a request to install a rule set (block 610). For example, the network device (e.g., using input component 305, switching component 310, controller 320, processor 420, communication interface 470, and/or the like) may receive a request to install a rule set, as described above.

As further shown in FIG. 6, process 600 may include adding, based on the request, information identifying the rule set to a list of rule sets associated with the network device (block 620). For example, the network device (e.g., using controller 320, processor 420, memory 430, and/or the like) may add, based on the request, information identifying the rule set to a list of rule sets associated with the network device, as described above.

As further shown in FIG. 6, process 600 may include receiving a packet destined for an endpoint device (block 630). For example, the network device (e.g., using input component 305, switching component 310, controller 320, processor 420, communication interface 470, and/or the like) may receive a packet destined for an endpoint device, as described above.

As further shown in FIG. 6, process 600 may include generating a copy of the packet (block 640). For example, the network device (e.g., using controller 320, processor 420, storage component 440, and/or the like) may generate a copy of the packet, as described above.

As further shown in FIG. 6, process 600 may include causing the packet to be forwarded to the endpoint device (block 650). For example, the network device (e.g., using switching component 310, output component 315, controller 320, processor 420, memory 430, communication interface 470, and/or the like) may cause the packet to be forwarded to the endpoint device, as described above.

As further shown in FIG. 6, process 600 may include performing deep packet inspection of the copy of the packet to identify a packet rule set associated with the copy of the packet (block 660). For example, the network device (e.g., using controller 320, processor 420, memory 430, and/or the like) may perform deep packet inspection of the copy of the packet to identify a packet rule set associated with the copy of the packet, as described above.

As further shown in FIG. 6, process 600 may include determining whether the packet rule set, associated with the copy of the packet, corresponds to the rule set added to the list of rule sets (block 670). For example, the network device (e.g., using controller 320, processor 420, storage component 440, and/or the like) may determine whether the packet rule set, associated with the copy of the packet, corresponds to the rule set added to the list of rule sets, as described above.

As further shown in FIG. 6, process 600 may include causing the copy of the packet to be forwarded to a content destination device when the packet rule set, associated with the copy of the packet, corresponds to the rule set (block 680). For example, the network device (e.g., using switching component 310, output component 315, controller 320, processor 420, memory 430, communication interface 470, and/or the like) may cause the copy of the packet to be forwarded to a content destination device when the packet rule set, associated with the copy of the packet, corresponds to the rule set, as described above.

As further shown in FIG. 6, process 600 may include preventing the copy of the packet from being forwarded to the content destination device when the packet rule set, associated with the copy of the packet, fails to correspond to the rule set (block 690). For example, the network device (e.g., using controller 320, processor 420, memory 430, and/or the like) may prevent the copy of the packet from being forwarded to the content destination device when the packet rule set, associated with the copy of the packet, fails to correspond to the rule set, as described above.

Process 600 may include additional implementations, such as any single implementation or any combination of implementations described below and/or in connection with one or more other processes described elsewhere herein.

In a first implementation, the request may prevent identification of a mediation device associated with generation of the request.

In a second implementation, alone or in combination with the first implementation, the rule set may include one or more of a rule identifying a field bit offset associated with a received packet, a rule identifying a length of a field associated with the received packet, a rule identifying a value of the field associated with the received packet, a rule identifying an operator of the field associated with the received packet, or a rule identifying an inter-rule set operator of the field associated with the received packet.

In a third implementation, alone or in combination with one or more of the first and second implementations, causing the copy of the packet to be forwarded to the content destination device may cause the content destination device to analyze the copy of the packet.

In a fourth implementation, alone or in combination with one or more of the first through third implementations, the rule set may be associated with capturing packets received via one or more of a multiprotocol label switching (MPLS) tunnel, an Internet protocol (IP)-in-IP tunnel, an MPLS over generic routing encapsulation (GRE) tunnel, a Dual-Stack Lite (DS-Lite) tunnel, an MPLS over user datagram protocol (UDP) tunnel, a Layer 3 virtual private network (L3VPN) tunnel, or a Layer 2 virtual private network (L2VPN) tunnel.

In a fifth implementation, alone or in combination with one or more of the first through fourth implementations, the rule set may be independent of protocols associated with packets received by the network device.

In a sixth implementation, alone or in combination with one or more of the first through fifth implementations, the copy of the packet may include one or more of signaling information, network management information, or content of communications.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
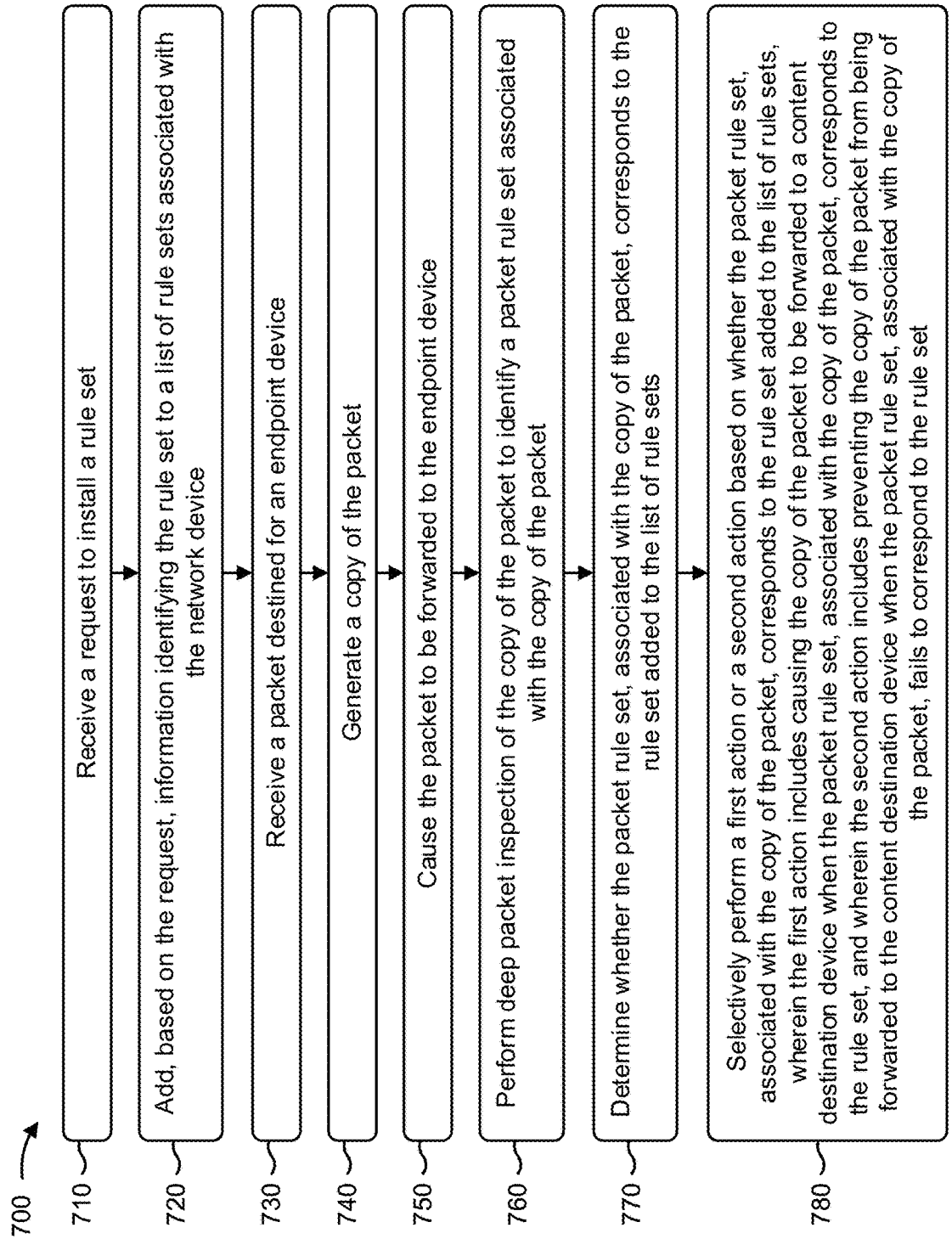

FIG. 7 is a flow chart of an example process 700 for lawfully intercepting traffic for analysis based on an application identifier or a URL associated with the traffic. In some implementations, one or more process blocks of FIG. 7 may be performed by a network device (e.g., network device 220). In some implementations, one or more process blocks of FIG. 7 may be performed by another device or a group of devices separate from or including the network device, such as an endpoint device (e.g., endpoint device 210), a mediation device (e.g., mediation device 240), and/or a content destination device (e.g., content destination device 250).

As shown in FIG. 7, process 700 may include receiving a request to install a rule set (block 710). For example, the network device (e.g., using input component 305, switching component 310, controller 320, processor 420, communication interface 470, and/or the like) may receive a request to install a rule set, as described above.

As further shown in FIG. 7, process 700 may include adding, based on the request, information identifying the rule set to a list of rule sets associated with the network device (block 720). For example, the network device (e.g., using controller 320, processor 420, memory 430, and/or the like) may add, based on the request, information identifying the rule set to a list of rule sets associated with the network device, as described above.

As further shown in FIG. 7, process 700 may include receiving a packet destined for an endpoint device (block 730). For example, the network device (e.g., using input component 305, switching component 310, controller 320, processor 420, communication interface 470, and/or the like) may receive a packet destined for an endpoint device, as described above.

As further shown in FIG. 7, process 700 may include generating a copy of the packet (block 740). For example, the network device (e.g., using controller 320, processor 420, memory 430, and/or the like) may generate a copy of the packet, as described above.

As further shown in FIG. 7, process 700 may include causing the packet to be forwarded to the endpoint device (block 750). For example, the network device (e.g., using switching component 310, output component 315, controller 320, processor 420, storage component 440, communication interface 470, and/or the like) may cause the packet to be forwarded to the endpoint device, as described above.

As further shown in FIG. 7, process 700 may include performing deep packet inspection of the copy of the packet to identify a packet rule set associated with the copy of the packet (block 760). For example, the network device (e.g., using controller 320, processor 420, memory 430, and/or the like) may perform deep packet inspection of the copy of the packet to identify a packet rule set associated with the copy of the packet, as described above.

As further shown in FIG. 7, process 700 may include determining whether the packet rule set, associated with the copy of the packet, corresponds to the rule set added to the list of rule sets (block 770). For example, the network device (e.g., using controller 320, processor 420, storage component 440, and/or the like) may determine whether the packet rule set, associated with the copy of the packet, corresponds to the rule set added to the list of rule sets, as described above.

As further shown in FIG. 7, process 700 may include selectively performing a first action or a second action based on whether the packet rule set, associated with the copy of the packet, corresponds to the rule set added to the list of rule sets, wherein the first action includes causing the copy of the packet to be forwarded to a content destination device when the packet rule set, associated with the copy of the packet, corresponds to the rule set, and wherein the second action includes preventing the copy of the packet from being forwarded to the content destination device when the packet rule set, associated with the copy of the packet, fails to correspond to the rule set (block 780). For example, the network device (e.g., using switching component 310, output component 315, controller 320, processor 420, memory 430, communication interface 470, and/or the like) may selectively perform a first action or a second action based on whether the packet rule set, associated with the copy of the packet, corresponds to the rule set added to the list of rule sets, as described above. In some implementations, the first action may include causing the copy of the packet to be forwarded to a content destination device when the packet rule set, associated with the copy of the packet, corresponds to the rule set. In some implementations, the second action may include preventing the copy of the packet from being forwarded to the content destination device when the packet rule set, associated with the copy of the packet, fails to correspond to the rule set.

Process 700 may include additional implementations, such as any single implementation or any combination of implementations described below and/or in connection with one or more other processes described elsewhere herein.

In a first implementation, receiving the request to install the rule set may include receiving the request to install the rule set from a mediation device, and the rule set is input via a graphical user interface or a script associated with the mediation device.

In a second implementation, alone or in combination with the first implementation, the one or more instructions, causing the copy of the packet to be forwarded to the content destination device may include causing the copy of the packet to be forwarded to the content destination device via Internet Protocol (IP)-User Datagram Protocol (UDP) encapsulation, or causing the copy of the packet to be forwarded to another network device connected to the content destination device via an Internet protocol (IP) security tunnel.

In a third implementation, alone or in combination with one or more of the first and second implementations, the rule set may include one or more of a rule identifying a field bit offset associated with a received packet, a rule identifying a length of a field associated with the received packet, a rule identifying a value of the field associated with the received packet, a rule identifying an operator of the field associated with the received packet, or a rule identifying an inter-rule set operator of the field associated with the received packet.

In a fourth implementation, alone or in combination with one or more of the first through third implementations, the rule set may be associated with capturing packets received via one or more of a multiprotocol label switching (MPLS) tunnel, an Internet protocol (IP)-in-IP tunnel, an MPLS over generic routing encapsulation (GRE) tunnel, a Dual-Stack Lite (DS-Lite) tunnel, an MPLS over user datagram protocol (UDP) tunnel, a Layer 3 virtual private network (L3VPN) tunnel, or a Layer 2 virtual private network (L2VPN) tunnel.

In a fifth implementation, alone or in combination with one or more of the first through fourth implementations, the rule set may be independent of protocols associated with packets received by the network device.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a network device, a first request to install a first rule set and a second request to install a second rule set,
     wherein the first rule set and the second rule set enable the network device to capture traffic independent of protocols associated with captured traffic;
   adding, by the network device and based on the first request or the second request, information identifying the first rule set and the second rule set to a list of rule sets associated with the network device;
   receiving, by the network device, a packet destined for an endpoint device;
   generating, by a packet forwarding component of the network device, a copy of the packet;
   causing, by the packet forwarding component of the network device, the packet to be forwarded to the endpoint device;
   performing, by the packet forwarding component of the network device, deep packet inspection of the copy of the packet to identify a packet rule set associated with the copy of the packet;
   determining, by the packet forwarding component of the network device, whether the packet rule set, associated with the copy of the packet, corresponds to the first rule set,
     wherein the packet rule set includes at least a rule identifying a bit offset of a field associated with the packet, and
     wherein determining whether the packet rule set corresponds to the first rule set comprises:
       determining whether one or more rules in the packet rule set and the rule set are equivalent;
   causing, by a packet tapping component of the network device, the copy of the packet to be forwarded to a first content destination device when the packet rule set, associated with the copy of the packet, corresponds to the first rule set;
   determining, by the network device, whether the packet rule set, associated with the copy of the packet, corresponds to the second rule set; and
   causing, by the packet tapping component of the network device, the copy of the packet to be forwarded to a second content destination device when the packet rule set, associated with the copy of the packet, corresponds to the second rule set,
     wherein the second content destination device is different than the first content destination device.

2. The method of claim 1, further comprising:
   preventing the copy of the packet from being forwarded to the first content destination device when the packet rule set, associated with the copy of the packet, fails to correspond to the first rule set.

3. The method of claim 1, wherein receiving the first request to install the first rule set comprises:
   receiving the first request to install the first rule set from a mediation device,
     wherein the first rule set is input via a graphical user interface or a script associated with the mediation device.

4. The method of claim 1, wherein causing the copy of the packet to be forwarded to the first content destination device includes:
   causing the copy of the packet to be forwarded to the first content destination device via Internet Protocol (IP)-User Datagram Protocol (UDP) encapsulation.

5. The method of claim 1, wherein the copy of the packet includes one or more of:
   signaling information,
   network management information, or
   content of communications.

6. The method of claim 1, wherein causing the copy of the packet to be forwarded to the first content destination device includes:
   causing the copy of the packet to be forwarded to another network device connected to the first content destination device via an Internet protocol (IP) security tunnel.

7. The method of claim 1, wherein receiving the first request to install the first rule set comprises:
   receiving the first request to install the first rule set via a dynamic tasking control protocol (DTCP).

8. A network device, comprising:
   one or more memories; and
   one or more processors to:
     receive a first request to install a first rule set and a second request to install a second rule set,
       wherein the first rule set and the second rule set enable the network device to capture traffic independent of protocols associated with captured traffic;

add, based on the first request or the second request, information identifying the first rule set and the second rule set to a list of rule sets associated with the network device;

receive a packet destined for an endpoint device;

generate, by a packet forwarding component of the network device, a copy of the packet;

cause, by the packet forwarding component, the packet to be forwarded to the endpoint device;

perform, by the packet forwarding component, deep packet inspection of the copy of the packet to identify a packet rule set associated with the copy of the packet;

determine, by the packet forwarding component, whether the packet rule set, associated with the copy of the packet, corresponds to the first rule set,
  wherein the packet rule set includes at least a rule identifying a bit offset of a field associated with the packet, and
  wherein the one or more processors, to determine whether the packet rule set corresponds to the rule set, are to:
    determine whether one or more rules in the packet rule set and the first rule set are equivalent;

cause, by a packet tapping component, the copy of the packet to be forwarded to a first content destination device when the packet rule set, associated with the copy of the packet, corresponds to the first rule set; and prevent the copy of the packet from being forwarded to the first content destination device when the packet rule set, associated with the copy of the packet, fails to correspond to the first rule set;

determine, whether the packet rule set, associated with the copy of the packet, corresponds to the second rule set; and cause, by the packet tapping component, the copy of the packet to be forwarded to a second content destination device when the packet rule set, associated with the copy of the packet, corresponds to the second rule set,
  wherein the second content destination device is different than the first content destination device.

9. The network device of claim 8, wherein the first request prevents identification of a mediation device associated with generation of the first request.

10. The network device of claim 8, wherein the first rule set includes one or more of:
a rule identifying a field bit offset associated with a received packet,
a rule identifying a length of a field associated with the received packet,
a rule identifying a value of the field associated with the received packet,
a rule identifying an operator of the field associated with the received packet, or
a rule identifying an inter-rule set operator of the field associated with the received packet.

11. The network device of claim 8, wherein causing the copy of the packet to be forwarded to the first content destination device causes the first content destination device to analyze the copy of the packet.

12. The network device of claim 8, wherein the first rule set is associated with capturing packets received via one or more of:
a multiprotocol label switching (MPLS) tunnel,
an Internet protocol (IP)-in-IP tunnel,
an MPLS over generic routing encapsulation (GRE) tunnel,
a Dual-Stack Lite (DS-Lite) tunnel,
an MPLS over user datagram protocol (UDP) tunnel,
a Layer 3 virtual private network (L3VPN) tunnel, or
a Layer 2 virtual private network (L2VPN) tunnel.

13. The network device of claim 8, the copy of the packet includes one or more of:
signaling information,
network management information, or
content of communications.

14. The network device of claim 8, wherein the first rule set is associated with capturing packets received via a first type of tunneled traffic and a second type of tunnel.

15. A non-transitory computer-readable medium storing instructions, the instructions comprising:
one or more instructions that, when executed by one or more processors of a network device, cause the one or more processors to:
  receive a first request to install a first rule set and a second request to install a second rule set,
    wherein the first rule set and the second rule set enable the network device to capture traffic independent of protocols associated with captured traffic;
  add, based on the first request and the second request, information identifying the first rule set and the second rule set to a list of rule sets associated with the network device;
  receive a packet destined for an endpoint device;
  generate, by a packet forwarding component of the network device, a copy of the packet;
  cause, by the packet forwarding component, the packet to be forwarded to the endpoint device;
  perform, by the packet forwarding component, deep packet inspection of the copy of the packet to identify a packet rule set associated with the copy of the packet;
  determine, by the packet forwarding component, whether the packet rule set, associated with the copy of the packet, corresponds to the first rule set,
    wherein the packet rule set includes at least a rule identifying a bit offset of a field associated with the packet, and
    wherein the one or more instructions, that cause the one or more processors to determine whether the packet rule set corresponds to the first rule set, cause the one or more processors to:
      determine whether one or more rules in the packet rule set and the first rule set are equivalent; and
  selectively perform a first action or a second action based on whether the packet rule set, associated with the copy of the packet, corresponds to the first rule set,
    wherein the first action includes causing, by a packet tapping component, the copy of the packet to be forwarded to a first content destination device when the packet rule set, associated with the copy of the packet, corresponds to the first rule set, and
    wherein the second action includes preventing the copy of the packet from being forwarded to the first content destination device when the packet rule set, associated with the copy of the packet, fails to correspond to the first rule set;
  determine, whether the packet rule set, associated with the copy of the packet, corresponds to the second rule set; and cause, by the packet tapping component, the copy of the packet to be forwarded to a second content destination device when the packet rule set, associated with the copy of the packet, corresponds to the second rule set,
    wherein the second content destination device is different than the first content destination device.

16. The non-transitory computer-readable medium of claim 15, wherein the one or more instructions, that cause the one or more processors to receive the second request to install the second rule set, cause the one or more processors to:
    receive the second request to install the second rule set from a mediation device,
        wherein the first rule set is input via a graphical user interface or a script associated with the mediation device.

17. The non-transitory computer-readable medium of claim 15, wherein the one or more instructions, that cause the one or more processors to cause the copy of the packet to be forwarded to the first content destination device, cause the one or more processors to one or more of:
    cause the copy of the packet to be forwarded to the first content destination device via Internet Protocol (IP)-User Datagram Protocol (UDP) encapsulation; or
    cause the copy of the packet to be forwarded to another network device connected to the first content destination device via an Internet protocol (IP) security tunnel.

18. The non-transitory computer-readable medium of claim 15, wherein the first rule set includes one or more of:
    a rule identifying a field bit offset associated with a received packet,
    a rule identifying a length of a field associated with the received packet,
    a rule identifying a value of the field associated with the received packet,
    a rule identifying an operator of the field associated with the received packet, or
    a rule identifying an inter-rule set operator of the field associated with the received packet.

19. The non-transitory computer-readable medium of claim 15, wherein the first rule set is associated with capturing packets received via one or more of:
    a multiprotocol label switching (MPLS) tunnel,
    an Internet protocol (IP)-in-IP tunnel,
    an MPLS over generic routing encapsulation (GRE) tunnel,
    a Dual-Stack Lite (DS-Lite) tunnel,
    an MPLS over user datagram protocol (UDP) tunnel,
    a Layer 3 virtual private network (L3VPN) tunnel, or
    a Layer 2 virtual private network (L2VPN) tunnel.

20. The non-transitory computer-readable medium of claim 15, wherein the first rule set is associated with capturing packets received via a first type of tunneled traffic and a second type of tunnel.

* * * * *